US012793349B2

(12) United States Patent
Fleischman et al.

(10) Patent No.: US 12,793,349 B2
(45) Date of Patent: Nov. 10, 2026

(54) INTERIOR/EXTERIOR BUILDING WALKTHROUGH IMAGE INTERFACE

(71) Applicant: Open Space Labs, Inc., San Francisco, CA (US)

(72) Inventors: Michael Ben Fleischman, Los Angeles, CA (US); Philip DeCamp, Boulder, CO (US); Gabriel Hein, Albany, CA (US)

(73) Assignee: Open Space Labs, Inc., San Francisco, CA (US)

( * ) Notice: Subject to any disclaimer, the term of this patent is extended or adjusted under 35 U.S.C. 154(b) by 172 days.

(21) Appl. No.: 18/406,548

(22) Filed: Jan. 8, 2024

(65) Prior Publication Data

US 2024/0233276 A1 Jul. 11, 2024

Related U.S. Application Data

(60) Provisional application No. 63/438,182, filed on Jan. 10, 2023.

(51) Int. Cl.

*G06T 7/55* (2017.01)
*G06T 17/00* (2006.01)
*G06T 19/00* (2011.01)

(52) U.S. Cl.

CPC ............ *G06T 19/003* (2013.01); *G06T 17/00* (2013.01); *G06T 2200/24* (2013.01); *G06T 2210/04* (2013.01)

(58) Field of Classification Search

CPC ... G06T 19/003; G06T 17/00; G06T 2200/24; G06T 2210/04

See application file for complete search history.

(56) References Cited

U.S. PATENT DOCUMENTS

| | | | | |
|---|---|---|---|---|
| 9,836,885 B1 * | 12/2017 | Eraker | ............... | G06Q 30/0623 |
| 10,650,106 B2 * | 5/2020 | Bell | ........................ | G06F 30/13 |
| 10,825,247 B1 * | 11/2020 | Vincent | .................. | G06V 20/20 |

(Continued)

OTHER PUBLICATIONS

PCT International Search Report and Written Opinion, PCT Application No. PCT/US2024/10746, Apr. 22, 2024, 10 pages.

*Primary Examiner* — Xiao M Wu
*Assistant Examiner* — George Renze
(74) *Attorney, Agent, or Firm* — Fenwick & West LLP

(57) ABSTRACT

A computing device accesses interior image frames captured by a mobile device as the mobile device is moved through an interior of a building. The computing device accesses exterior image frames captured by a UAV as the UAV navigates around an exterior of the building. The computing device generates a 3D model representative of the building based on the image frames. The computing device generates an interface displaying the 3D model in a first interface portion. The computing device identifies a displayed portion of the 3D model that corresponds to one or more of the accessed exterior image frames. The computing device modifies the first interface portion to display an interface element at a location corresponding to the identified portion of the 3D model. In response to a selection of the displayed interface element, the computing device modifies a second interface portion to display the one or more accessed exterior image frames that correspond to the identified portion of the 3D model.

18 Claims, 8 Drawing Sheets

(56) References Cited

U.S. PATENT DOCUMENTS

| | | | | |
|---|---|---|---|---|
| 12,347,033 | B1 * | 7/2025 | Li | G06T 17/10 |
| 2018/0143756 | A1 * | 5/2018 | Mildrew | G06F 3/013 |
| 2019/0251352 | A1 * | 8/2019 | Hovden | G06T 7/74 |
| 2022/0114291 | A1 * | 4/2022 | Li | G06T 19/00 |

* cited by examiner

INTERIOR/EXTERIOR BUILDING WALKTHROUGH IMAGE INTERFACE

CROSS REFERENCE TO RELATED APPLICATIONS

This application claims the benefit of U.S. Provisional Application No. 63/438,182, filed Jan. 10, 2023, which is incorporated by reference in its entirety.

TECHNICAL FIELD

This disclosure relates to generating models of an environment.

BACKGROUND

Images of an environment may be useful for reviewing details associated with the environment without having to visit the environment in person. For example, a realtor may wish to create a virtual tour of a house by capturing a series of photographs of the rooms in the house to allow interested parties to view the house virtually. Similarly, a contractor may wish to monitor progress on a construction site by capturing images of the construction site at various points during constructions and comparing images captured at different times.

SUMMARY

A system accesses interior image frames captured by a mobile device as the mobile device is moved through an interior of a building and accesses exterior image frames captured by an unmanned aerial vehicle ("UAV") as the UAV navigates around an exterior of the building. The system generates a 3D model representative of the building based on the image frames. The system generates an interface displaying the 3D model in a first interface portion. The system identifies a displayed portion of the 3D model that corresponds to one or more of the accessed exterior image frames. The system modifies the first interface portion to display an interface element at a location corresponding to the identified portion of the 3D model. In response to a selection of the displayed interface element, the system modifies a second interface portion to display the one or more accessed exterior image frames that correspond to the identified portion of the 3D model.

DETAILED DESCRIPTION

I. Overview

Figure 1:
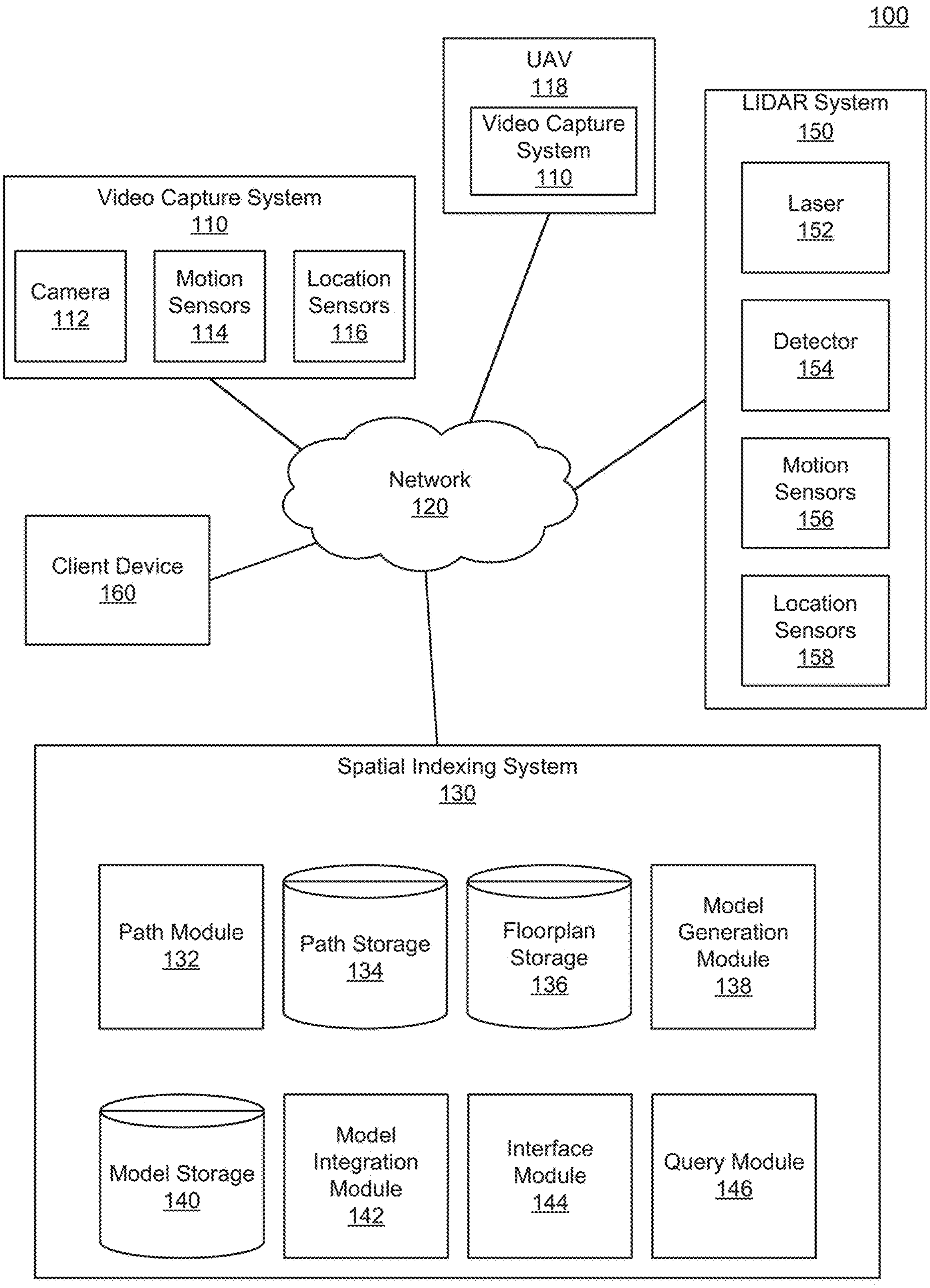
FIG. 1 illustrates a system environment for a spatial indexing system, according to one embodiment.

A spatial indexing system receives a video that includes a sequence of image frames depicting an environment and aligns the image frames with a 3D model of the environment generated using light detection and ranging (LIDAR) data. The image frames are captured by a video capture system that is moved through environment along a path. The LIDAR data is collected by a LIDAR system, and the spatial indexing system generates the 3D model of the environment based on the LIDAR data received from the LIDAR system. The spatial indexing system aligns the images with the 3D model. In some embodiments, the LIDAR system is integrated with the video capture system such that the image frames and the LIDAR data are captured simultaneously and are time synchronized. Based on the time synchronization, the spatial indexing system may determine locations at which each of the image frames were captured and determine a portion of the 3D model that the image frame corresponds to. In other embodiments, the LIDAR system is a separate from the video capture system, and the spatial indexing system may use feature vectors associated with the LIDAR data and feature vectors associated with the image frames for alignment.

The spatial indexing system generates an interface with a first interface portion for displaying a 3D model and a second interface portion for displaying an image frame. The spatial indexing system may receive an interaction from a user indicating a portion of the 3D model to be displayed. For example, the interaction may include selecting a waypoint icon associated with a location within the 3D model or selecting an object in the 3D model. The spatial indexing system identifies an image frame that is associated with the selected portion of the 3D model and displays the corresponding image frame in the second interface portion. When the spatial indexing system receives another interaction indicating another portion of the 3D model to be displayed, the interface is updated to display the other portion of the 3D model in the first interface and display a different image frame associated with the other portion of the 3D model.

In some embodiments, a spatial indexing system accesses interior image frames captured by a mobile device as the mobile device is moved through an interior of a building. The spatial indexing system accesses exterior image frames captured by a UAV (or another exterior image capture system, though reference is made herein to UAVs for the purposes of simplicity) as the UAV navigates around an exterior of the building. The spatial indexing system generates a 3D model representative of the building based on the image frames. The spatial indexing system generates an interface displaying the 3D model in a first interface portion. The spatial indexing system identifies a displayed portion of the 3D model that corresponds to one or more of the accessed exterior image frames. The spatial indexing system modifies the first interface portion to display an interface element at a location corresponding to the identified portion of the 3D model. In response to a selection of the displayed interface element, the spatial indexing system modifies a second interface portion to display the one or more accessed exterior image frames that correspond to the identified portion of the 3D model.

In some embodiments, a spatial indexing system accesses interior image frames and/or depth information captured by a mobile device as the mobile device is moved through an interior of a building. The spatial indexing system accesses exterior image frames captured by a UAV as the UAV navigates around an exterior of the building. The spatial indexing system accesses a floor plan of the building. The spatial indexing system aligns the interior image frames and the exterior image frames to the accessed floor plan. The spatial indexing system generates an interface displaying one or more interior image frames in a first interface portion. The spatial indexing system identifies a displayed interior image frame that corresponds to one or more of the accessed exterior image frames using the floor plan. The spatial indexing system modifies the first interface portion to display an interface element at a location corresponding to the identified displayed interior frame. In response to a selection of the displayed interface element, the spatial indexing system modifies a second interface portion to display the one or more accessed exterior image frames that correspond to the identified displayed interior frame.

In some embodiments, a spatial indexing system accesses interior image frames and/or depth information captured by a mobile device as the mobile device is moved through an interior of a building. The spatial indexing system accesses exterior image frames captured by a UAV as the UAV navigates around an exterior of the building. The spatial indexing system aligns the interior image frames and the exterior image frames to a coordinate system. The spatial indexing system generates an interface displaying one or more interior image frames in a first interface portion. The spatial indexing system identifies a displayed interior image frame that corresponds to one or more of the accessed exterior image frames using the coordinate system. The spatial indexing system modifies the first interface portion to display an interface element at a location corresponding to the identified displayed interior frame. In response to a selection of the displayed interface element, the spatial indexing system modifies a second interface portion to display the one or more accessed exterior image frames that correspond to the identified displayed interior frame.

II. System Environment

FIG. 1 illustrates a system environment 100 for a spatial indexing system, according to one embodiment. In the embodiment shown in FIG. 1, the system environment 100 includes a video capture system 110, a UAV 118, a network 120, a spatial indexing system 130, a LIDAR system 150, and a client device 160. Although a single video capture system 110, a single LIDAR system 150, and a single client device 160 is shown in FIG. 1, in some implementations the spatial indexing system 130 interacts with multiple video capture systems 110, multiple LIDAR systems 150, and/or multiple client devices 160.

The video capture system 110 collects one or more of frame data, motion data, and location data as the video capture system 110 is moved along a path. In the embodiment shown in FIG. 1, the video capture system 110 includes a camera 112, motion sensors 114, and location sensors 116. The video capture system 110 may be implemented as a device with a form factor that is suitable for being moved along the path. In one embodiment, the video capture system 110 is a portable device that a user physically moves along the path, such as a wheeled cart or a device that is mounted on or integrated into an object that is worn on the user's body (e.g., a backpack or hardhat). In another embodiment, the video capture system 110 is mounted on or integrated into a vehicle. The vehicle may be, for example, a wheeled vehicle (e.g., a wheeled robot) or an aircraft (e.g., UAV 118, a quadcopter drone, etc.), and may be configured to autonomously travel along a preconfigured route or be controlled by a human user in real-time. In some embodiments, the video capture system 110 is a part of a mobile computing device such as a smartphone, tablet computer, or laptop computer. The video capture system 110 may be carried by a user and used to capture a video as the user moves through the environment along the path.

The camera 112 collects videos including a sequence of image frames as the video capture system 110 is moved along the path. In some embodiments, the camera 112 is a 360-degree camera that captures 360-degree frames. The camera 112 may be implemented by arranging multiple non-360-degree cameras in the video capture system 110 so that they are pointed at varying angles relative to each other, and configuring the multiple non-360 cameras to capture frames of the environment from their respective angles at approximately the same time. The image frames may then be combined to form a single 360-degree frame. For example, the camera 112 may be implemented by capturing frames at substantially the same time from two 180° panoramic cameras that are pointed in opposite directions. In other embodiments, the camera 112 has a narrow field of view and is configured to capture typical 2D images instead of 360-degree frames.

The frame data captured by the video capture system 110 may further include frame timestamps. The frame timestamps are data corresponding to the time at which each frame was captured by the video capture system 110. As used herein, frames are captured at substantially the same time if they are captured within a threshold time interval of each other (e.g., within 1 second, within 100 milliseconds, etc.).

In one embodiment, the camera 112 captures a walkthrough video as the video capture system 110 is moved throughout the environment. The walkthrough video including a sequence of image frames that may be captured at any frame rate, such as a high frame rate (e.g., 60 frames per second) or a low frame rate (e.g., 1 frame per second). In general, capturing the sequence of image frames at a higher frame rate produces more robust results, while capturing the sequence of image frames at a lower frame rate allows for reduced data storage and transmission. In another embodiment, the camera 112 captures a sequence of still frames separated by fixed time intervals. In yet another embodiment, the camera 112 captures single image frames. The motion sensors 114 and location sensors 116 collect motion data and location data, respectively, while the camera 112 is capturing the frame data. The motion sensors 114 may include, for example, an accelerometer and a gyroscope. The motion sensors 114 may also include a magnetometer that measures a direction of a magnetic field surrounding the video capture system 110.

The location sensors 116 may include a receiver for a global navigation satellite system (e.g., a GPS receiver) that determines the latitude and longitude coordinates of the video capture system 110. In some embodiments, the location sensors 116 additionally or alternatively include a receiver for an indoor positioning system (IPS) that determines the position of the video capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the video capture system 110 shown in FIG. 1 includes a camera 112, motion sensors 114, and location sensors 116, some of the components 112, 114, 116 may be omitted from the video capture system 110 in other embodiments. For instance, one or both of the motion sensors 114 and the location sensors 116 may be omitted from the video capture system.

In some embodiments, the video capture system 110 is implemented as part of a computing device (e.g., the computer system 600 shown in FIG. 6) that also includes a storage device to store the captured data and a communication interface that sends the captured data over the network 120 to the spatial indexing system 130. In one embodiment, the video capture system 110 stores the captured data locally as the video capture system 110 is moved along the path, and the data is sent to the spatial indexing system 130 after the data collection has been completed. In another embodiment, the video capture system 110 sends the captured data to the spatial indexing system 130 in real-time as the system 110 is being moved along the path.

The video capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 120 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

Continuing with FIG. 1, the UAV 118 may interact with an external system, such as the spatial indexing system 130, through the network 120. A video capture system 110 may be mounted or integrated into the UAV 118, which may capture aerial image frames of an environment such as a building. For example, the UAV 118 may capture images of the building from outside the building.

In some embodiments, a camera 112 is attached to the UAV and is responsible for capturing exterior image frames of a building from different angles. For example, the camera 112 may be a multi-lensed camera system offering various perspectives and covering a large field of view. In some embodiments, the UAV may come equipped with depth-sensing systems, such as LIDAR sensors, structured light sensors, or time-of-flight sensors. These depth-sensing systems may capture depth information in the form of depth maps, which may be later integrated with exterior image frames for constructing detailed 3D models.

In some embodiments, the UAV 118 may have built-in motion sensors 114, such as accelerometers and gyroscopes, which measure linear acceleration and rotational motion, respectively. Data from these sensors help the UAV estimate and correct its position and orientation during flight. In some embodiments, the UAV 118 may have location sensors 116, such as GPS, which provide precise location information during the flight. This data may assist in estimating the position of the UAV relative to the building, which may be used for accurately aligning the exterior image frames with a 3D model.

The UAV 118 may include a propulsion system consisting of electric motors, propellers, and a battery. This system provides the necessary thrust to keep the UAV airborne, navigate the flight path, and maneuver around the building while capturing exterior image frames and other relevant data. The UAV 118 may also have a flight controller, which acts as a central processing and control unit of the UAV. It processes data from various sensors, manages the propulsion and stabilization systems, and communicates with an external system to transmit data, such as the captured image frames and other sensor data. The UAV 118 may also include a communication module, which enables wireless data transmission between the UAV and an external system. The communication may take place through Wi-Fi, radio frequency, or other wireless communication protocols. This module may be responsible for transmitting captured image frames, depth maps, and sensor data to the system for further processing and/or generating a 3D model.

In some embodiments, the UAV 118 may capture image frames and depth information (if available) using camera and depth-sensing systems while flying around a building. This information, along with the UAV's position and orientation data from the UAV's motion and location sensors, may be transmitted through the network 120 to the spatial indexing system 130.

Continuing with FIG. 1, the light detection and ranging (LIDAR) system 150 collects three dimensional data representing the environment using a laser 152 and a detector 154 as the LIDAR system 150 is moved throughout the environment. The laser 152 emits laser pulses, and the detector 154 detects when the laser pulses return to the LIDAR system 150 after being reflected by a plurality of points on objects or surfaces in the environment. The LIDAR system 150 also includes motion sensors 156 and location sensors 158 that indicates the motion and the position of the LIDAR system 150 which may be used to determine the direction in which the laser pulses are emitted. The LIDAR system 150 generates LIDAR data associated with detected laser pulses after being reflected off surfaces of the objects or surfaces in the environment. The LIDAR data may include a set of (x,y,z) coordinates determined based on known direction in which the laser pulses were emitted and duration of time between emission by the laser 152 and detection by the detector 154. The LIDAR data may also include other attribute data such as intensity of detected laser pulse. In other embodiments, the LIDAR system 150 may be replaced by another depth-sensing system. Examples of depth-sensing systems include radar systems, 3D camera systems, and the like.

In some embodiments, the LIDAR system 150 is integrated with the video capture system 110. For example, the LIDAR system 150 and the video capture system 110 may be components of a smartphone that is configured to capture videos and LIDAR data. The video capture system 110 and the LIDAR system 150 may be operated simultaneously such that the video capture system 110 captures the video of the environment while the LIDAR system 150 collects LIDAR data. When the video capture system 110 and the LIDAR system 150 are integrated, the motion sensors 114 may be the same as the motion sensors 156 and the location sensors 116 may be the same as the location sensors 158. The LIDAR system 150 and the video capture system 110 may be aligned, and points in the LIDAR data may be mapped to a pixel in the image frame that was captured at the same time as the points such that the points are associated with image data (e.g., RGB values).

The LIDAR system 150 may also collect timestamps associated with points. Accordingly, image frames and LIDAR data may be associated with each other based on timestamps. As used herein, a timestamp for LIDAR data may correspond to a time at which a laser pulse was emitted toward point or a time at which the laser pulse was detected by the detector 154. That is, for a timestamp associated with an image frame indicating a time at which the image frame was captured, one or more points in the LIDAR data may be associated with the same timestamp. In some embodiments, the LIDAR system 150 may be used while the video capture system 110 is not being used, and vice versa. In some embodiments, the LIDAR system 150 is a separate system from the video capture system 110. In such embodiments, the path of the video capture system 110 may be different from the path of the LIDAR system 150.

Continuing with FIG. 1, the spatial indexing system 130 receives the image frames captured by the video capture system(s) 110 and the LIDAR collected by the LIDAR system 150, performs a spatial indexing process to automatically identify the spatial locations at which each of the image frames and the LIDAR data were captured to align the image frames to a 3D model generated using the LIDAR data. After aligning the image frames to the 3D model, the spatial indexing system 130 provides a visualization interface that allows the client device 160 to select a portion of the 3D model to view along with a corresponding image frame side by side. In the embodiment shown in FIG. 1, the spatial indexing system 130 includes a path module 132, a path storage 134, a floorplan storage 136, a model generation module 138, a model storage 140, a model integration module 142, an interface module 144, and a query module 146. In other embodiments, the spatial indexing system 130 may include fewer, different, or additional modules.

The path module 132 receives the image frames in the walkthrough video and the other location and motion data that were collected by the video capture system 110 and determines the path of the video capture system 110 based on the received frames and data. In one embodiment, the path is defined as a 6D camera pose for each frame in the walkthrough video that includes a sequence of frames. The 6D camera pose for each frame is an estimate of the relative position and orientation of the camera 112 when the image frame was captured. The path module 132 may store the path in the path storage 134.

In one embodiment, the path module 132 uses a SLAM (simultaneous localization and mapping) algorithm to simultaneously (1) determine an estimate of the path by inferring the location and orientation of the camera 112 and (2) model the environment using direct methods or using landmark features (such as oriented FAST and rotated BRIEF (ORB), scale-invariant feature transform (SIFT), speeded up robust features (SURF), etc.) extracted from the walkthrough video that is a sequence of frames. The path module 132 outputs a vector of six dimensional (6D) camera poses over time, with one 6D vector (three dimensions for location, three dimensions for orientation) for each frame in the sequence, and the 6D vector may be stored in the path storage 134.

The spatial indexing system 130 may also include floorplan storage 136, which stores one or more floorplans, such as those of environments captured by the video capture system 110. As referred to herein, a floorplan is a to-scale, two-dimensional (2D) diagrammatic representation of an environment (e.g., a portion of a building or structure) from a top-down perspective. In alternative embodiments, the floorplan may be a 3D model of the expected finished construction instead of a 2D diagram (e.g., building information modeling (BIM) model). The floorplan may be annotated to specify positions, dimensions, and types of physical objects that are expected to be in the environment. In some embodiments, the floorplan is manually annotated by a user associated with a client device 160 and provided to the spatial indexing system 130. In other embodiments, the floorplan is annotated by the spatial indexing system 130 using a machine learning model that is trained using a training dataset of annotated floorplans to identify the positions, the dimensions, and the object types of physical objects expected to be in the environment. Different portions of a building or structure may be represented by separate floorplans. For example, the spatial indexing system 130 may store separate floorplans for each floor of a building, unit, or substructure.

The model generation module 138 generates a 3D model of the environment. In some embodiments, the 3D model is based on image frames captured by the video capture system 110. To generate the 3D model of the environment based on image frames, the model generation module 138 may use methods such as structure from motion (SfM), simultaneous localization and mapping (SLAM), monocular depth map generation, or other methods. The 3D model may be generated using the image frames from the walkthrough video of the environment, the relative positions of each of the image frames (as indicated by the image frame's 6D pose), and (optionally) the absolute position of each of the image frames on a floorplan of the environment. The image frames from the video capture system 110 may be stereo images that may be combined to generate the 3D model. In some embodiments, the model generation module 138 generates a 3D point cloud based on the image frames using photogrammetry. In some embodiments, the model generation module 138 generates the 3D model based on LIDAR data from the system 150. The model generation module 138 may process the LIDAR data to generate a point cloud which may have a higher resolution compared to the 3D model generated with image frames. After generating the 3D model, the model generation module 138 stores the 3D model in the model storage 140.

In one embodiment, the model generation module 138 receives a frame sequence and its corresponding path (e.g., a 6D pose vector specifying a 6D pose for each frame in the walkthrough video that is a sequence of frames) from the path module 132 or the path storage 134 and extracts a subset of the image frames in the sequence and their corresponding 6D poses for inclusion in the 3D model. For example, if the walkthrough video that is a sequence of frames are frames in a video that was captured at 30 frames per second, the model generation module 138 subsamples the image frames by extracting frames and their corresponding 6D poses at 0.5-second intervals. An embodiment of the model generation module 138 is described in detail below with respect to FIG. 2B.

In the embodiment illustrated in FIG. 1, the 3D model is generated by the model generation module 138 in the spatial indexing system 130. However, in an alternative embodiment, the model generation module 138 may be generated by a third party application (e.g., an application installed on a mobile device that includes the video capture system 110 and/or the LIDAR system 150). The image frames captured by the video capture system 110 and/or LIDAR data collected by the LIDAR system 150 may be transmitted via the network 120 to a server associated with the application that processes the data to generate the 3D model. The spatial indexing system 130 may then access the generated 3D model and align the 3D model with other data associated with the environment to present the aligned representations to one or more users.

The model integration module 142 integrates the 3D model with other data that describe the environment. The other types of data may include one or more images (e.g., image frames from the video capture system 110), a 2D floorplan, a diagram, and annotations describing characteristics of the environment. The model integration module 142 determines similarities in the 3D model and the other data to align the other data with relevant portions of the 3D model. The model integration module 142 may determine which portion of the 3D model that the other data corresponds to and store an identifier associated with the determined portion of the 3D in association with the other data.

In some embodiments, the model integration module 142 may align the 3D model generated based on LIDAR data with one or more image frames based on time synchronization. As described above, the video capture system 110 and the LIDAR system 150 may be integrated into a single system that captures image frames and LIDAR data at the same time. For each image frame, the model integration module 142 may determine a timestamp at which the image frame was captured and identify a set of points in the LIDAR data associated with the same timestamp. The model integration module 142 may then determine which portion of the 3D model includes the identified set of points and align the image frame with the portion. Furthermore, the model integration module 142 may map pixels in the image frame to the set of points.

In some embodiments, the model integration module 142 may align a point cloud generated using LIDAR data (hereinafter referred to as "LIDAR point cloud") with another point cloud generated based on image frames (hereinafter referred to as "low-resolution point cloud"). This method may be used when the LIDAR system 150 and the video capture system 110 are separate systems. The model integration module 142 may generate a feature vector for each point in the LIDAR point cloud and each point in the low-resolution point cloud (e.g., using ORB, SIFT, HardNET). The model integration module 142 may determine feature distances between the feature vectors and match point pairs between the LIDAR point cloud and the low-resolution point cloud based on the feature distances. A 3D pose between the LIDAR point cloud and the low-resolution point cloud is determined to produce a greater number of geometric inliers for point pairs using, for example, random sample consensus (RANSAC) or non-linear optimization. Since the low-resolution point cloud is generated with image frames, the LIDAR point cloud is also aligned with the image frames themselves.

In some embodiments, the model integration module 142 may align the 3D model with a diagram or one or more image frames based on annotations associated with the diagram or the one or more image frames. The annotations may be provided by a user or determined by the spatial indexing system 130 using image recognition or machine learning models. The annotations may describe characteristics of objects or surfaces in the environment such as dimensions or object types. The model integration module 142 may extract features within the 3D model and compare the extracted features to annotations. For example, if the 3D model represents a room within a building, the extracted features from the 3D model may be used to determine the dimensions of the room. The determined dimensions may be compared to a floorplan of the construction site that is annotated with dimensions of various rooms within the building, and the model integration module 142 may identify a room within the floorplan that matches the determined dimensions. In some embodiments, the model integration module 142 may perform 3D object detection on the 3D model and compare outputs of the 3D object detection to outputs from the image recognition or machine learning models based on the diagram or the one or more images.

In some embodiments, the model integration module 142 may integrate the 3D model with other data such as exterior image frames received and/or stored at the spatial indexing system 130, or exterior image frames captured by the UAV 118 of FIG. 1. For example, by processing the exterior image frames, the model integration module 142 may identify portions of the 3D model corresponding to the exterior image frames. This identification process may involve feature extraction, feature matching, alignment based on matched features and estimated camera pose, and mapping of the exterior image frames to their corresponding 3D model portions. These steps may provide a consistent and accurate spatial representation of the combined 3D model and exterior image frames.

In some embodiments, the model integration module 142 may process the exterior image frames captured by the UAV and extract distinctive features, such as points, edges, or object boundaries. Feature extraction algorithms like SIFT (Scale-Invariant Feature Transform), SURF (Speeded-Up Robust Features), or ORB (Oriented FAST and Rotated BRIEF) may be employed for this purpose.

In some embodiments, the model integration module 142 may identify corresponding features within the 3D model by searching for similarities between the features extracted from exterior image frames and features within the 3D model. This may be achieved using feature matching algorithms such as KNN (k-Nearest Neighbors), FLANN (Fast Approximate Nearest Neighbors), or Bag-of-Words-based methods. By finding these correspondences, the model integration module 142 may associate specific portions of the 3D model with the captured exterior image frames.

In some embodiments, with the matched features and the estimated camera pose of the UAV, the model integration module 142 may align the exterior image frames with the 3D model. This alignment may ensure that the spatial relationship between the exterior image frames and the 3D model is maintained accurately. Bundle adjustment algorithms may be used to optimize and refine the alignment by minimizing reprojection errors, ensuring that feature points are consistently positioned in both the image frames and the 3D model. In some cases, manual alignment or iterative closest point (ICP) algorithms may also be used for further refining the positioning and orientation of the 3D model based on the image frames.

In some embodiments, after aligning the exterior image frames with the 3D model, the model integration module 142 may determine which displayed portions of the 3D model correspond to one or more exterior image frames.

During this step, the model integration module 142 may generate a mapping or an index that links exterior image frames to their associated portions of the 3D model.

In some embodiments, the 3D model may be manually aligned with the diagram based on input from a user. The 3D model and the diagram may be presented to a client device 160 associated with the user, and the user may select a location within the diagram indicating a location corresponding to the 3D model. For example, the user may place a pin at a location in a floorplan that corresponds to the LIDAR data.

The interface module 144 provides a visualization interface to the client device 160 to present information associated with the environment. The interface module 144 may generate the visualization interface responsive to receiving a request from the client device 160 to view one or more models representing the environment. The interface module 144 may first generate the visualization interface to includes a 2D overhead map interface representing a floorplan of the environment from the floorplan storage 136. The 2D overhead map may be an interactive interface such that clicking on a point on the map navigates to the portion of the 3D model corresponding to the selected point in space. The visualization interface provides a first-person view of the portion of the 3D model that allows the user to pan and zoom around the 3D model and to navigate to other portions of the 3D model by selecting waypoint icons that represent the relative locations of the other portions.

The visualization interface also allows the user to select an object within the 3D model, which causes the visualization interface to display an image frame corresponding to the selected object. The user may select the object by interacting with a point on the object (e.g., clicking on a point on the object). When the interface module 144 detects the interaction from the user, the interface module 144 sends a signal to the query module 146 indicating the location of the point within the 3D model. The query module 146 identifies the image frame that is aligned with the selected point, and the interface module 144 updates the visualization interface to display the image frame. The visualization interface may include a first interface portion for displaying the 3D model and include a second interface portion for displaying the image frame.

In some embodiments, the interface module 144 may receive a request to measure a distance between endpoints selected on the 3D model or the image frame. The interface module 144 may provide identities of the endpoints to the query module 146, and the query module 146 may determine (x, y, z) coordinates associated with the endpoints. The query module 146 may calculate a distance between the two coordinates and return the distance to the interface module 144. The interface module 144 may update the interface portion to display the requested distance to the user. Similarly, the interface module 144 may receive additional endpoints with a request to determine an area or volume of an object.

In some embodiments, the interface module 144 may modify a first interface portion of the interface to display an interface element at a location corresponding to a portion of the 3D model, providing user interaction and presentation of exterior views. The interface module may create an interface element that visually indicates the availability of one or more exterior views related to a portion of the 3D model. This interface element may take the form of icons, buttons, highlighting, shading, tooltips, hotspots, arrows, lines, text labels, or overlay blends. The choice and design of the interface element may be tailored to the specific building structures, layout, or user preferences. To accurately place the interface element within the first interface portion, the interface module 144 may use location information associated with both the interior and exterior images. Location information may include GPS coordinates, a common coordinate system, or building floor plan coordinates. With the location information, the interface module may place the interface element at the desired position within the first interface portion. This position corresponds to the identified portion of the 3D model, ensuring that the interface element is accurately placed and visually represents the portion of the model with the available exterior view. After placing the interface element, the interface module 144 may update the content of the first interface portion to include the newly generated interface element. This update may involve, for example, rendering the interface element using appropriate rendering techniques (such as 2D or 3D graphics libraries) or updating the DOM (Document Object Model) of a web-based interface to include the new interface element.

In some embodiments, the interface module 144 may attach event listeners or input handlers to the newly created interface element to monitor user interactions (e.g., clicks or taps) with the interface element. These listeners or handlers may trigger a response when a user interacts with the interface element, allowing the system to update the second interface portion of the interface with corresponding image frames of the exterior of the building.

In response to a selection of the interface element, the interface module 144 may modify a second interface portion of the interface to display image frames of the exterior of the building that correspond to a portion of the 3D model. For example, once a user selects the interface element, the interface module 144 may retrieve location information corresponding to the portion of the building represented by the interface element. This information may include GPS coordinates, a common coordinate system, or building floor plan coordinates. By using the location information, the interface module 144 may identify the exterior images that correspond to the interface element. For example, this process may involve comparing the location information of the interface element with the location information of each image in the exterior image frames. Based on this comparison, the system may identify the relevant exterior images linked to the interface element's location.

After identifying exterior images corresponding to the interface element's location, the interface module 144 may display them in a second interface portion of the interface. Updating the interface's content or rendering the selected images within the second interface portion may be achieved using appropriate rendering techniques and graphics libraries, such as 2D or 3D graphics libraries. In some embodiments, the interface module 144 may generate additional interface elements (e.g., buttons, icons, or sliders) within the second interface portion to provide users with control to switch between or navigate through the image frames. Event listeners or input handlers may continually monitor user interactions with these additional interface elements. When users interact with these elements, the system may modify the second interface portion content to switch between or provide control of the image frames according to user input. In some embodiments, the interface module 144 may modify the second interface portion to display corresponding interior view of the building. This may be achieved by updating the content of the second interface portion and adding relevant interior images based on the location information associated with the exterior view.

The client device 160 may be any mobile computing device such as a smartphone, tablet computer, laptop computer or non-mobile computing device such as a desktop computer that may connect to the network 120 and be used to access the spatial indexing system 130. The client device 160 displays, on a display device such as a screen, the interface to a user and receives user inputs to allow the user to interact with the interface. An example implementation of the client device is described below with reference to the computer system 900 in FIG. 9.

III. Path Generation Overview

Figure 2A:
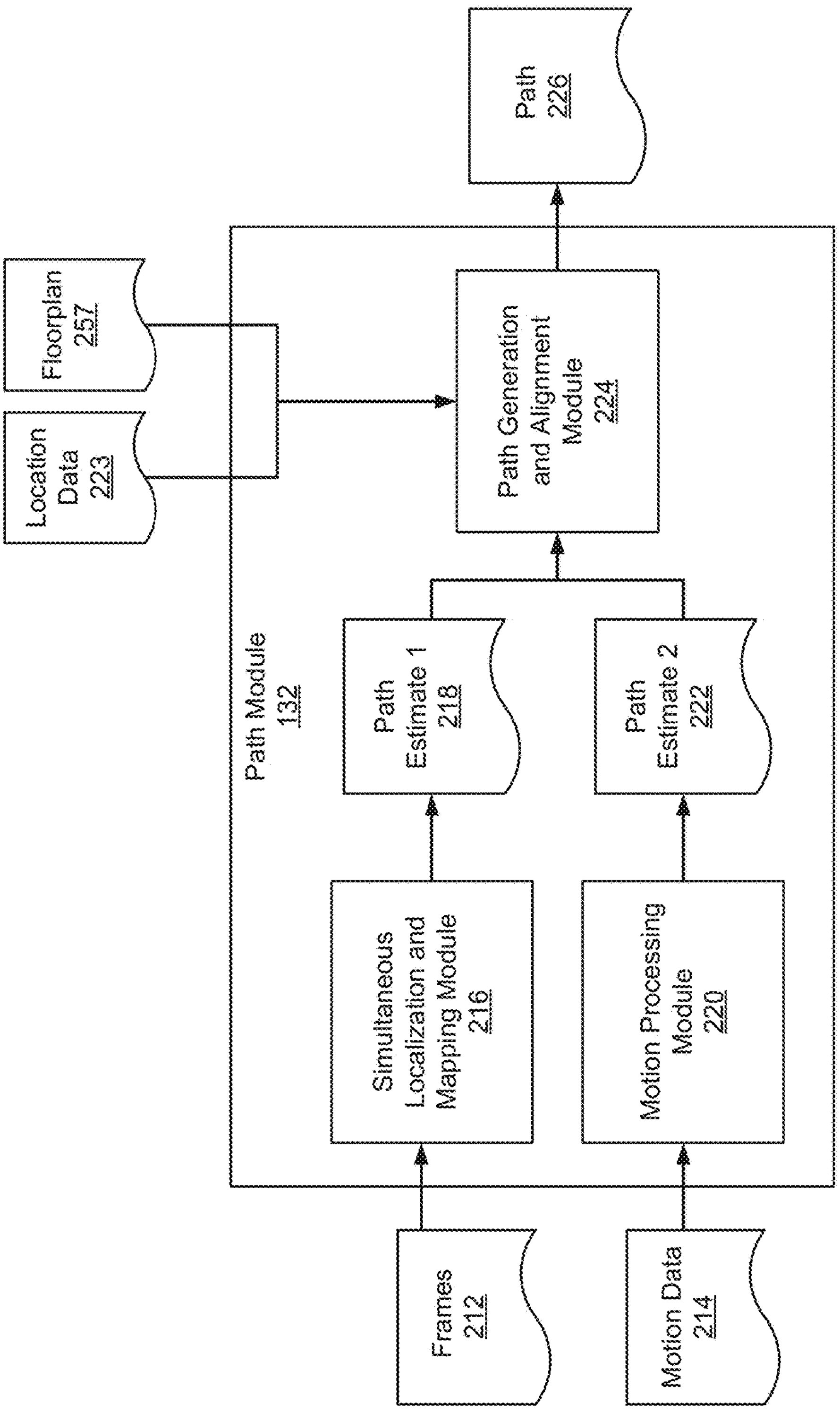
FIG. 2A illustrates a block diagram of a path module, according to one embodiment.

FIG. 2A illustrates a block diagram of the path module 132 of the spatial indexing system 130 shown in FIG. 1, according to one embodiment. The path module 132 receives input data (e.g., a sequence of frames 212, motion data 214, location data 223, floorplan 257) captured by the video capture system 110 and the LIDAR system 150 and generates a path 226. In the embodiment shown in FIG. 2A, the path module 132 includes a simultaneous localization and mapping (SLAM) module 216, a motion processing module 220, and a path generation and alignment module 224.

The SLAM module 216 receives the sequence of frames 212 and performs a SLAM algorithm to generate a first estimate 218 of the path. Before performing the SLAM algorithm, the SLAM module 216 may perform one or more preprocessing steps on the image frames 212. In one embodiment, the pre-processing steps include extracting features from the image frames 212 by converting the sequence of frames 212 into a sequence of vectors, where each vector is a feature representation of a respective frame. In particular, the SLAM module may extract SIFT features, SURF features, or ORB features.

After extracting the features, the pre-processing steps may also include a segmentation process. The segmentation process divides the walkthrough video that is a sequence of frames into segments based on the quality of the features in each of the image frames. In one embodiment, the feature quality in a frame is defined as the number of features that were extracted from the image frame. In this embodiment, the segmentation step classifies each frame as having high feature quality or low feature quality based on whether the feature quality of the image frame is above or below a threshold value, respectively (i.e., frames having a feature quality above the threshold are classified as high quality, and frames having a feature quality below the threshold are classified as low quality). Low feature quality may be caused by, e.g., excess motion blur or low lighting conditions.

After classifying the image frames, the segmentation process splits the sequence so that consecutive frames with high feature quality are joined into segments and frames with low feature quality are not included in any of the segments. For example, suppose the path travels into and out of a series of well-lit rooms along a poorly lit hallway. In this example, the image frames captured in each room are likely to have high feature quality, while the image frames captured in the hallway are likely to have low feature quality. As a result, the segmentation process divides the walkthrough video that is a sequence of frames so that each sequence of consecutive frames captured in the same room is split into a single segment (resulting in a separate segment for each room), while the image frames captured in the hallway are not included in any of the segments.

After the pre-processing steps, the SLAM module 216 performs a SLAM algorithm to generate a first estimate 218 of the path. In one embodiment, the first estimate 218 is also a vector of 6D camera poses over time, with one 6D vector for each frame in the sequence. In an embodiment where the pre-processing steps include segmenting the walkthrough video that is a sequence of frames, the SLAM algorithm is performed separately on each of the segments to generate a path segment for each segment of frames.

The motion processing module 220 receives the motion data 214 that was collected as the video capture system 110 was moved along the path and generates a second estimate 222 of the path. Similar to the first estimate 218 of the path, the second estimate 222 may also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the video capture system 110.

The data generated by many consumer-grade gyroscopes includes a time-varying bias (also referred to as drift) that may impact the accuracy of the second estimate 222 of the path if the bias is not corrected. In an embodiment where the motion data 214 includes all three types of data described above (accelerometer, gyroscope, and magnetometer data), and the motion processing module 220 may use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the video capture system 110. Meanwhile, the magnetometer data is used to estimate the heading bias of the gyroscope. Because magnetometer data may be noisy, particularly when used inside a building whose internal structure includes steel beams, the motion processing module 220 may compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the path into a combined estimate of the path 226. In an embodiment where the video capture system 110 also collects location data 223 while being moved along the path, the path generation module 224 may also use the location data 223 when generating the path 226. If a floorplan of the environment is available, the path generation and alignment module 224 may also receive the floorplan 257 as input and align the combined estimate of the path 226 to the floorplan 257.

IV. Model Generation Overview

Figure 2B:
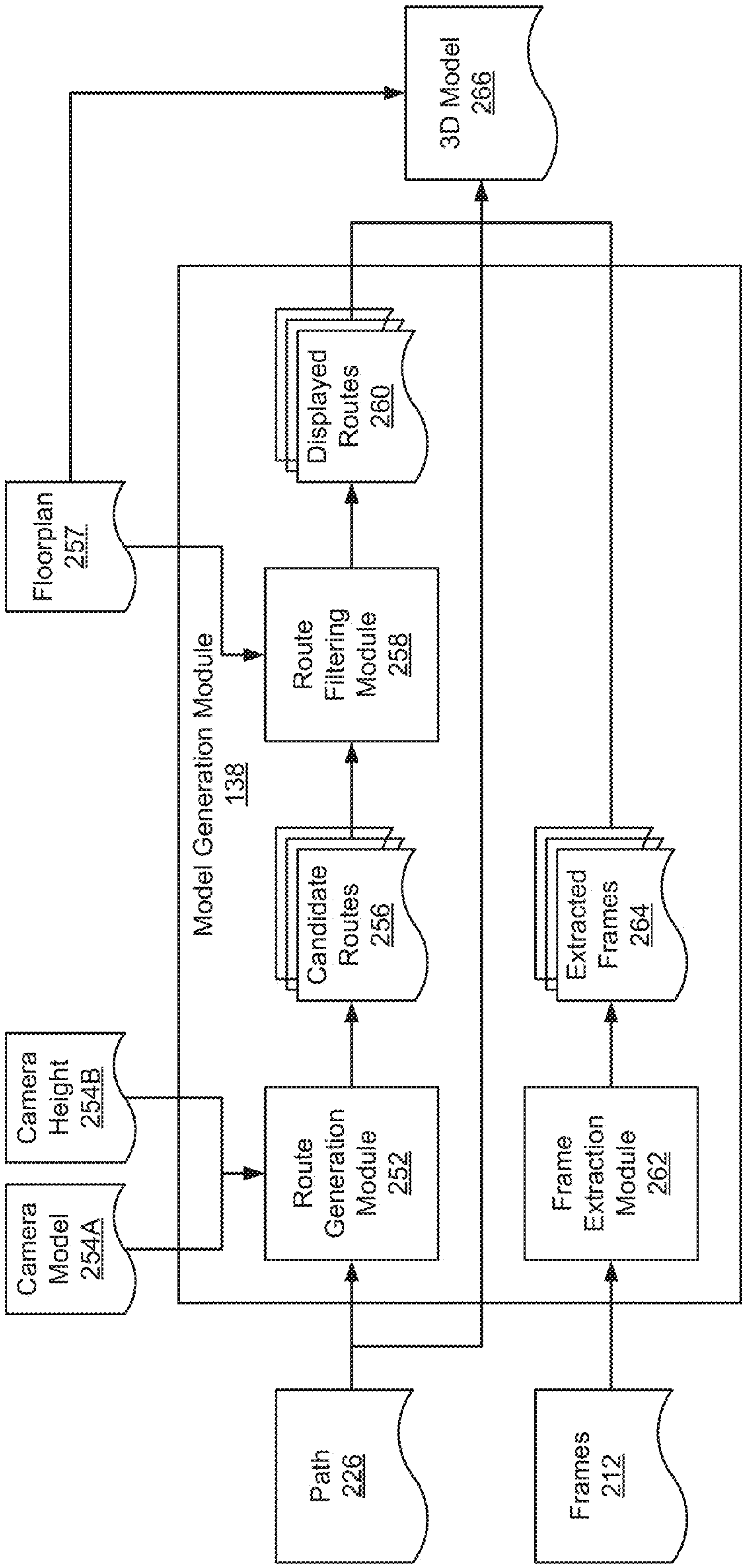
FIG. 2B illustrates a block diagram of a model generation module, according to one embodiment.

FIG. 2B illustrates a block diagram of the model generation module 138 of the spatial indexing system 130 shown in FIG. 1, according to one embodiment. FIG. 2B illustrates 3D model 266 generated based on image frames. The model generation module 138 receives the path 226 generated by the path module 132, along with the sequence of frames 212 that were captured by the video capture system 110, a floorplan 257 of the environment, and information about the camera 254. The output of the model generation module 138 is a 3D model 266 of the environment. In the illustrated embodiment, the model generation module 138 includes a route generation module 252, a route filtering module 258, and a frame extraction module 262.

The route generation module 252 receives the path 226 and camera information 254 and generates one or more candidate route vectors 256 for each extracted frame. The camera information 254 includes a camera model 254A and camera height 254B. The camera model 254A is a model that maps each 2D point in a frame (i.e., as defined by a pair of coordinates identifying a pixel within the image frame) to a 3D ray that represents the direction of the line of sight from the camera to that 2D point. In one embodiment, the spatial indexing system 130 stores a separate camera model for each type of camera supported by the system 130. The camera height 254B is the height of the camera relative to the floor of the environment while the walkthrough video that is a sequence of frames is being captured. In one embodiment, the camera height is assumed to have a constant value during the image frame capture process. For instance, if the camera is mounted on a hardhat that is worn on a user's body, then the height has a constant value equal to the sum of the user's height and the height of the camera relative to the top of the user's head (both quantities may be received as user input).

As referred to herein, a route vector for an extracted frame is a vector representing a spatial distance between the extracted frame and one of the other extracted frames. For instance, the route vector associated with an extracted frame has its tail at that extracted frame and its head at the other extracted frame, such that adding the route vector to the spatial location of its associated frame yields the spatial location of the other extracted frame. In one embodiment, the route vector is computed by performing vector subtraction to calculate a difference between the three-dimensional locations of the two extracted frames, as indicated by their respective 6D pose vectors.

Referring to the interface module 144, the route vectors for an extracted frame are later used after the interface module 144 receives the 3D model 266 and displays a first-person view of the extracted frame. When displaying the first-person view, the interface module 144 renders a waypoint icon at a position in the image frame that represents the position of the other frame (e.g., the image frame at the head of the route vector). In one embodiment, the interface module 144 uses the following equation to determine the position within the image frame at which to render the waypoint icon corresponding to a route vector:

$$P_{icon}=M_{proj}*(M_{view})^{-1}*M_{delta}*G_{ring}.$$

In this equation, $M_{proj}$ is a projection matrix containing the parameters of the camera projection function used for rendering, $M_{view}$ is an isometry matrix representing the user's position and orientation relative to his or her current frame, $M_{delta}$ is the route vector, $G_{ring}$ is the geometry (a list of 3D coordinates) representing a mesh model of the waypoint icon being rendered, and $P_{icon}$ is the geometry of the icon within the first-person view of the image frame.

Referring again to the route generation module 252, the route generation module 252 may compute a candidate route vector 256 between each pair of extracted frames. However, displaying a separate waypoint icon for each candidate route vector associated with a frame may result in a large number of waypoint icons (e.g., several dozen) being displayed in a frame, which may overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 258 may select the displayed route vectors 260 based on a variety of criteria. For example, the candidate route vectors 256 may be filtered based on distance (e.g., only route vectors having a length less than a threshold length are selected).

In some embodiments, the route filtering module 258 also receives a floorplan 257 of the environment and also filters the candidate route vectors 256 based on features in the floorplan. In one embodiment, the route filtering module 258 uses the features in the floorplan to remove any candidate route vectors 256 that pass through a wall, which results in a set of displayed route vectors 260 that only point to positions that are visible in the image frame. This may be done, for example, by extracting a frame patch of the floorplan from the region of the floorplan surrounding a candidate route vector 256, and submitting the image frame patch to a frame classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The image frame extraction module 262 receives the sequence of 360-degree frames and extracts some or all of the image frames to generate extracted frames 264. In one embodiment, the sequences of 360-degree frames are captured as frames of a 360-degree walkthrough video, and the image frame extraction module 262 generates a separate extracted frame of each frame. As described above with respect to FIG. 1, the image frame extraction module 262 may also extract a subset of image frames from the walkthrough video. For example, if the walkthrough video that is a sequence of frames 212 was captured at a relatively high framerate (e.g., 30 or 60 frames per second), the image frame extraction module 262 may extract a subset of the image frames at regular intervals (e.g., two frames per second of video) so that a more manageable number of extracted frames 264 are displayed to the user as part of the 3D model.

The floorplan 257, displayed route vectors 260, path 226, and extracted frames 264 are combined into the 3D model 266. As noted above, the 3D model 266 is a representation of the environment that comprises a set of extracted frames 264 of the environment, the relative positions of each of the image frames (as indicated by the 6D poses in the path 226). In the embodiment shown in FIG. 2B, the 3D model also includes the floorplan 257, the absolute positions of each of the image frames on the floorplan, and displayed route vectors 260 for some or all of the extracted frames 264.

V. Spatial Indexing of Frames Based on Floorplan Features

As noted above, the visualization interface may provide a 2D overhead view map that displays the location of each frame within a floorplan of the environment. In addition to being displayed in the overhead view, the floorplan of the environment may also be used as part of the spatial indexing process that determines the location of each frame.

Figure 3:
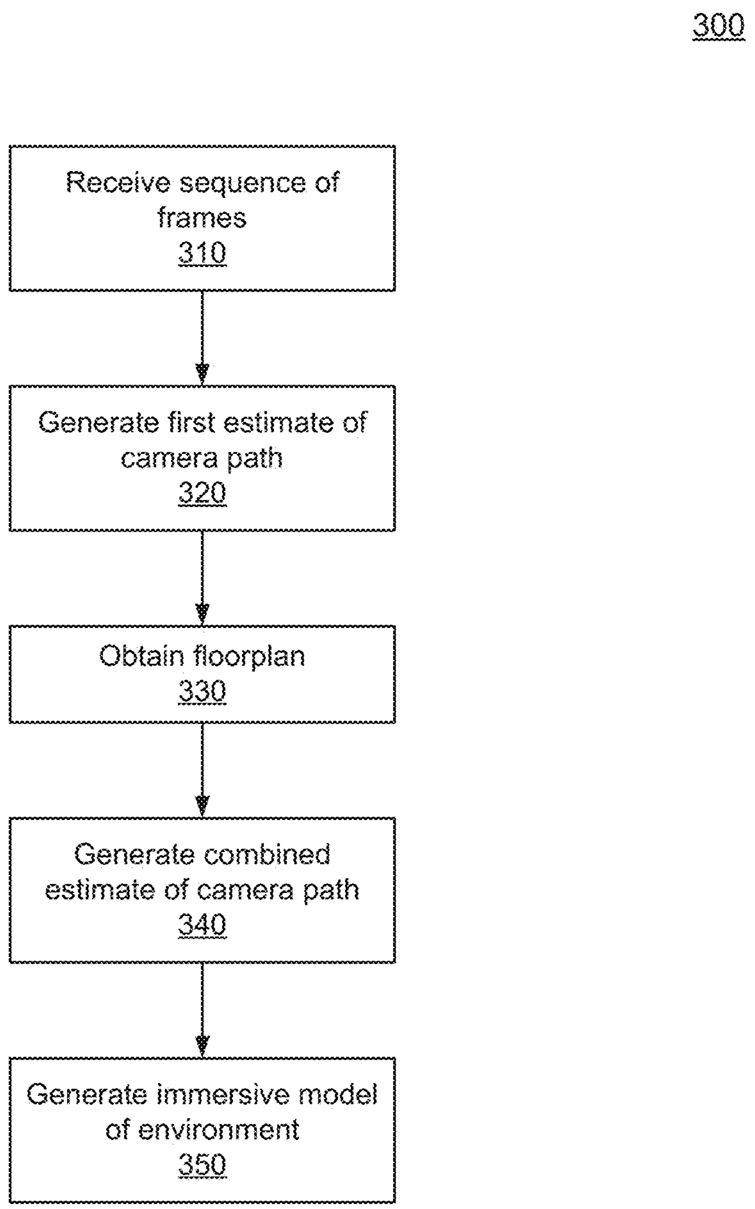
FIG. 3 is a flow chart illustrating an example method for automated spatial indexing of frames using features in a floorplan, according to one embodiment.

FIG. 3 is a flow chart illustrating an example method 300 for automated spatial indexing of frames using features in a floorplan, according to one embodiment. In other embodiments, the method 300 may include additional, fewer, or different steps, and the steps shown in FIG. 3 may be performed in a different order. For instance, the method 300 may be performed without obtaining 330 a floorplan, in which case the combined estimate of the path is generated 340 without using features in the floorplan.

The spatial indexing system 130 receives 310 a walkthrough video that is a sequence of frames from a video capture system 110. The image frames in the sequence are captured as the video capture system 110 is moved through an environment (e.g., a floor of a construction site) along a path. In one embodiment, each of the image frames is a frame that is captured by a camera on the video capture system (e.g., the camera 112 described above with respect to FIG. 1). In another embodiment, each of the image frames has a narrower field of view, such as 90 degrees.

The spatial indexing system 130 generates 320 a first estimate of the path based on the walkthrough video that is a sequence of frames. The first estimate of the path may be represented, for example, as a six-dimensional vector that specifies a 6D camera pose for each frame in the sequence. In one embodiment, a component of the spatial indexing system 130 (e.g., the SLAM module 216 described above with reference to FIG. 2A) performs a SLAM algorithm on the walkthrough video that is a sequence of frames to simultaneously determine a 6D camera pose for each frame and generate a three-dimensional virtual model of the environment.

The spatial indexing system 130 obtains 330 a floorplan of the environment. For example, multiple floorplans (including the floorplan for the environment that is depicted in the received walkthrough video that is a sequence of frames) may be stored in the floorplan storage 136, and the spatial indexing system 130 accesses the floorplan storage 136 to obtain the floorplan of the environment. The floorplan of the environment may also be received from a user via the video capture system 110 or a client device 160 without being stored in the floorplan storage 136.

The spatial indexing system 130 generates 340 a combined estimate of the path based on the first estimate of the path and the physical objects in the floorplan. After generating 340 the combined estimate of the path, the spatial indexing system 130 generates 350 a 3D model of the environment. For example, the model generation module 138 generates the 3D model by combining the floorplan, a plurality of route vectors, the combined estimate of the path, and extracted frames from the walkthrough video that is a sequence of frames, as described above with respect to FIG. 2B.

In some embodiments, the spatial indexing system 130 may also receive additional data (apart from the walkthrough video that is a sequence of frames) that was captured while the video capture system is being moved along the path. For example, the spatial indexing system also receives motion data or location data as described above with reference to FIG. 1. In embodiments where the spatial indexing system 130 receives additional data, the spatial indexing system 130 may use the additional data in addition with the floorplan when generating 340 the combined estimate of the path.

In an embodiment where the spatial indexing system 130 receives motion data along with the walkthrough video that is a sequence of frames, the spatial indexing system 130 may perform a dead reckoning process on the motion data to generate a second estimate of the path, as described above with respect to FIG. 2A. In this embodiment, the step of generating 340 the combined estimate of the path includes using portions of the second estimate to fill in gaps in the first estimate of the path. For example, the first estimate of the path may be divided into path segments due to poor feature quality in some of the captured frames (which causes gaps where the SLAM algorithm cannot generate a reliable 6D pose, as described above with respect to FIG. 2A). In this case, 6D poses from the second path estimate may be used to join the segments of the first path estimate by filling in the gaps between the segments of the first path estimate.

As noted above, in some embodiments the method 300 may be performed without obtaining 330 a floorplan and the combined estimate of the path is generated 340 without using features in the floorplan. In one of these embodiments, the first estimate of the path is used as the combined estimate of the path without any additional data processing or analysis.

In another one of these embodiments, the combined estimate of the path is generated 340 by generating one or more additional estimates of the path, calculating a confidence score for each 6D pose in each path estimate, and selecting, for each spatial position along the path, the 6D pose with the highest confidence score. For instance, the additional estimates of the path may include one or more of: a second estimate using motion data, as described above, a third estimate using data from a GPS receiver, and a fourth estimate using data from an IPS receiver. As described above, each estimate of the path is a vector of 6D poses that describe the relative position and orientation for each frame in the sequence.

The confidence scores for the 6D poses are calculated differently for each path estimate. For instance, confidence scores for the path estimates described above may be calculated in the following ways: a confidence score for a 6D pose in the first estimate (generated with a SLAM algorithm) represents the feature quality of the image frame corresponding to the 6D pose (e.g., the number of detected features in the image frame); a confidence score for a 6D pose in the second estimate (generated with motion data) represents a level of noise in the accelerometer, gyroscope, and/or magnetometer data in a time interval centered on, preceding, or subsequent to the time of the 6D pose; a confidence score for a 6D pose in the third estimate (generated with GPS data) represents GPS signal strength for the GPS data used to generate the 6D pose; and a confidence score for a 6D pose in the fourth estimate (generated with IPS data) represents IPS signal strength for the IPS data used to generate the 6D pose (e.g., RF signal strength).

After generating the confidence scores, the spatial indexing system 130 iteratively scans through each estimate of the path and selects, for each frame in the sequence, the 6D pose having the highest confidence score, and the selected 6D pose is output as the 6D pose for the image frame in the combined estimate of the path. Because the confidence scores for each path estimate are calculated differently, the confidence scores for each path estimate may be normalized to a common scale (e.g., a scalar value between 0 and 1, with 0 representing the lowest possible confidence and 1 representing the highest possible confidence) before the iterative scanning process takes place.

VI. Interface Generation Overview

Figure 4:
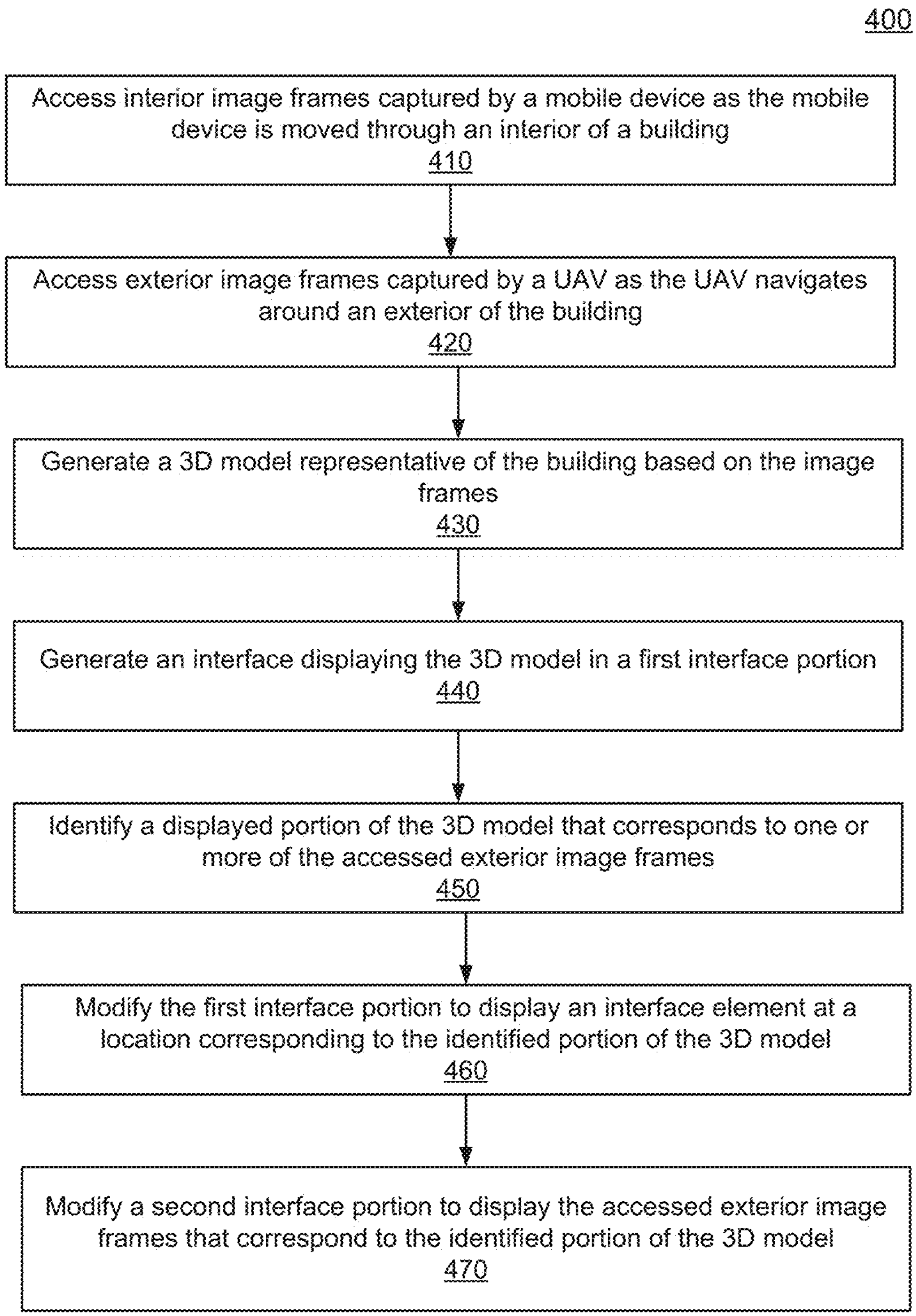
FIG. 4 is a flow chart illustrating an example method for generating an interface, according to one embodiment.

FIG. 4 is a flow chart illustrating an example method 400 for generating an interface integrating both interior and exterior image frames of a building, according to one embodiment. In other embodiments, the method 400 may include additional, fewer, or different steps, and the steps shown in FIG. 4 may be performed in a different order. In some embodiments, the method 400 may be performed by a computer system, such as the spatial indexing system 130 of FIG. 1. The method 400 may also be performed by any suitable system.

Continuing with FIG. 4, the system accesses 410 interior image frames captured by a mobile device as the mobile device is moved through an interior of a building. In some embodiments, a mobile device, equipped with a video capture system (e.g., the video capture system 110 in FIG. 1) and a depth-sensing system (e.g., a LIDAR system 150 in FIG. 1) captures interior image frames as the mobile device moves through the building (e.g., a floor of a construction site) along a camera path. Each of the frames may be a 360-degree frame that is captured by a 360-degree camera in the video capture system, such as the 360-degree camera 112 described above with respect to FIG. 1.

The depth-sensing system may generate depth maps that correspond to each captured image frame. In some embodiments, along with the image frames and depth data, the mobile device collects data from its built-in motion sensors such as the motion sensors 114 in FIG. 1, and location sensors, such as the location sensors 116 in FIG. 1, to estimate its position and orientation within the building.

The captured image frames, depth information, and associated sensor data may be stored in the mobile device's local storage or directly transmitted to an external storage system, such as a cloud storage service, via a network connection. The system may access the stored image frames and depth information from the storage location. For example, this may be done through a direct connection with the mobile device or via a network connection (e.g., Wi-Fi, cellular, or a wired connection) to retrieve the data from the cloud storage or other external storage systems.

Continuing with FIG. 4, the system accesses 420 exterior image frames captured by a UAV (e.g., UAV 118 in FIG. 1) as the UAV captures images of the building from outside the building. The UAV may be equipped with a camera that captures exterior image frames as it flies around the building. The captured images may cover various angles of the exterior of the building, providing a comprehensive view of the building and its surroundings. Along with capturing the image frames, the UAV may collect data from its built-in motion sensors (e.g., accelerometer, gyroscope) and location sensors (e.g., GPS) to estimate its position and orientation relative to the building during its flight.

The captured exterior image frames and associated sensor data may be stored in the UAV's local storage during the flight. After completing the flight, the UAV may transmit the data to an external storage system, such as a cloud storage service or a remote server, via a network connection. The system may access the stored exterior image frames from the specified storage location. This may be done through a direct connection with the UAV or via a network connection to retrieve the data from the cloud storage or other external storage systems.

In some embodiments, for lower portions of a building, images may be captured by a user with a mobile device as the user walks around the exterior of the building, at or near ground level. Likewise, for higher portions of the building, images may be captured by the UAV as the UAV flies around an exterior of the building.

Continuing with FIG. 4, the system generates 430 a 3D model representative of the building based on the image frames. In some embodiments, the system may integrate depth information with the interior image frames such that both the interior image frames and the depth information provide a more comprehensive representation of the interior of the building. The depth data may offer a third dimension, which flat image frames may lack. In some embodiments, the system may process the interior image frames, optionally along with their corresponding depth information (e.g., LIDAR data), to create an interior 3D model. Techniques such as Structure-from-Motion (SFM), Simultaneous Localization and Mapping (SLAM), or other depth estimation methods may be employed to generate the 3D model. These methods may utilize the depth maps and the position and orientation data from the capture device sensors to construct an accurate three-dimensional representation of the building's interior.

In some embodiments, exterior image frames and depth information captured by the UAV may be processed by the system to generate an exterior 3D model. This step may be similar to the interior 3D model generation, but it may use the exterior image frames and optionally corresponding depth information, as well as motion and location data captured by the UAV or any other suitable capture device. Methods such as SFM, SLAM, or other depth estimation techniques may be employed to construct the exterior 3D model.

After generating the 3D model(s), the system may map any one of the 3D models to a common coordinate system or a floor plan for the building. This step may involve transforming the corresponding 3D model to maintain consistency in scale, orientation, and position within a floor plan or a coordinate system of the building. The floor plan may be a 2D representation or a 3D model, such as a Building Information Model (BIM).

Alignment of the 3D model with the image frames may be accomplished using various algorithms that ensure consistency and accuracy in the spatial representation. For example, feature-matching techniques may be used to identify common points or features in both the image frames and the 3D model, which may then be utilized to correctly position and orient the image frames with respect to the 3D model. Bundle adjustment algorithms may optimize the alignment by minimizing the reprojection error, ensuring that feature points are consistently positioned in both the image frames and the 3D model. In some cases, manual alignment or iterative closest point (ICP) algorithms may be used to refine the positioning and orientation of the 3D model based on the image frames.

In some embodiments, the system may combine the interior and exterior 3D models into a single, unified 3D model representative of the building. This holistic model incorporates both interior and exterior data, enabling users to interact with and visualize the building more effectively. In such embodiments, the interior 3D model and the exterior 3D model of the building may be aligned, enabling locations within the interior 3D model and locations within the exterior 3D model that correspond to a same portion of a building's outside wall to be identified. In other embodiments, the system may only process the interior or exterior 3D model.

Continuing with FIG. 4, the system generates 440 an interface displaying the 3D model in a first interface portion. In some embodiments, the walkthrough interfaces of the system may be modified to display both interior representations of a building and exterior representations of the building.

In some embodiments, the system may create an interface design featuring two primary portions. The first portion may be designed for displaying the 3D model, while the second portion may be designed to display image frames corresponding to specific areas of the 3D model. Advantageously, this interface structure allows users to interactively explore the 3D model along with contextual image frames simultaneously.

Further, the system may configure various interface components, such as buttons, sliders, menus, and viewing panels, which enable users to interact with the 3D model and image frames. These components are organized and placed within the layout of the interface to create an intuitive and user-friendly experience.

In some embodiments, the system may incorporate the 3D model and respective image frames into the interface structure by embedding the graphical representation of the 3D model into a first portion of the interface and displaying corresponding image frames in second portion of the interface. This allows users to seamlessly navigate and visualize both the 3D model and the image frames within the interface. The system may implement interactive features, such as zoom, pan, and rotate options for viewing the 3D model, as well as click or tap events for selecting specific parts of the model in the first portion of the interface and displaying the corresponding image frames in the second portion of the interface. Users may also interact with other interface components, like buttons or menus, to change the display settings, view additional information, or navigate between different areas of the 3D model and image frames.

In some embodiments, the system may deploy the interface to a user device (e.g., a desktop computer, laptop, tablet, or smartphone) for visualization and interaction. The interface may be presented through a web browser, a standalone application, or a platform-specific app. The 3D model and the image frames may be rendered using appropriate rendering engines and APIs (e.g., OpenGL, WebGL, DirectX, or Vulkan) for smooth and responsive visualization and user interaction.

In some embodiments, corresponding interior and exterior portions of the building may be identified within the interior and exterior images of the building. In some embodiments, location information (such as GPS coordinates) may be used to identify interior and exterior images that correspond to a same portion of the building. For instance, an interior view of an outside wall of the building may be identified within an image of the interior of the building by using a set of GPS coordinates captured by the device that captured the interior image. In some embodiments, a corresponding image of the exterior of the building may be identified by querying GPS coordinates associated with the exterior images using the GPS coordinates of the interior image to identify an exterior image closest to the GPS coordinates of the interior image. In some embodiments, interior and exterior images may be mapped to a common coordinate system (for instance, using GPS or other localization/alignment techniques). In some embodiments, any one of the interior and exterior images may be mapped to a floor plan for the building.

Continuing with FIG. 4, the system identifies 450 displayed portions of the 3D model that corresponds to one or more of the accessed exterior image frames. In some embodiments, to identify the displayed portion of the 3D model corresponding to the exterior image frames, the system may extract features from the exterior image frames, match the exterior image frame features with corresponding features within the 3D model, align the exterior image frames with the 3D model based on the matched features, and determine the displayed portion of the 3D model that corresponds with the exterior image frames based on the alignment.

The system may process the exterior image frames and extract distinctive features (e.g., points, edges, or object boundaries) from the images. Feature extraction algorithms, such as SIFT, SURF, or ORB, may be employed for this purpose. To matching features with the 3D model, the system may identify corresponding features within the 3D model by searching for similarities between the features extracted from exterior image frames and features within the model. This may be done using feature matching algorithms, such as KNN, FLANN, or Bag-of-Words-based methods. By finding these correspondences, the system may associate specific portions of the 3D model with the image frames of the exterior of the building. For example, using the matched features and the estimated camera pose, the system may determine which displayed portions of the 3D model correspond with one or more exterior image frames. During this step, the system may create a mapping or an index that links exterior image frames to their associated model portions.

Continuing with FIG. 4, the system may modify 460 a first portion of the interface to display an interface element at the location corresponding to an identified portion of the 3D model. In some embodiments, the system may generate an interface element indicating the availability of one or more exterior views related to the identified portion of the 3D model. The interface element may act as visual cues or indicators on the interface to help users access the corresponding exterior views of the building. Examples of interface elements may include icons, buttons, highlighting, shading, pop-up dialog, tooltip, hotspots, arrows, lines, text labels, and overlay blend. For example, icons may take the form of a camera, magnifying glass, or other symbols that indicate an exterior view is available. The choice and design of the interface element may be tailored according to the specific building structures, layout, or user preferences.

In some embodiments, a button, such as clickable or tappable area with a label that signifies the availability of exterior views when pressed, may be provided as interface element. Example of buttons may include rectangles, rounded corners, or circles containing labels or icons. Portions of the 3D model, such as the outside wall, may be highlighted or shaded to indicate that exterior views are available for those locations. The highlighting or shading may change when the user hovers or clicks on the location.

In some cases, when the user hovers over or clicks on a specific area, a small dialog or tooltip may appear, showing a thumbnail or brief description of the available exterior view. Alternatively, hotspots such as interactive areas in the 3D model, may be provided. They may change color, glow, or present an animation when hovered over, signaling the availability of exterior views.

Directional indicators such as arrows or lines may be used to connect the interior portion of the 3D model with corresponding exterior views, guiding users on where to click or tap. Text labels may be placed next to the outside wall of the building or at specific locations within the 3D model to let users know that exterior views are available for those areas. In some cases, the system may blend or overlay the exterior image on top of the interior image with a level of transparency, allowing users to see a combined view of both interior and exterior perspectives. A combination of the above elements, such as an icon contained within a button, may also be employed to create an intuitive and user-friendly interface.

Once the interface element is generated, the system may place it at the location within the first interface portion that corresponds to the identified portion of the 3D model. To achieve accurate placement, the system may use location information (e.g., GPS coordinates, common coordinate system or floor plan) associated with both the interior and exterior images.

Continuing with FIG. 4, the system may modify 470 a second interface portion to display the exterior image frames that correspond to the identified portion of the 3D model. In some embodiments, the system may continuously listen for user interactions with the interface elements within the first interface portion. This may be accomplished using event listeners or input handlers, depending on the programming language or framework employed for the interface. When a user interacts with (e.g., clicks or taps) an interface element, the system may detect this action and trigger a response. The detection may be accomplished through event handlers or callbacks, programmed to respond to specific input events associated with user interactions. Upon detecting user interaction with the interface element, the system may retrieve the location information corresponding to the building portion represented by the selected interface element. This location information may include GPS coordinates, a common coordinate system, or building floor plan coordinates.

Using the location information, the system may identify the exterior images that correspond to the selected interface element. This process may involve retrieving the location information of the selected interface element and comparing the location information of the selected interface element with the location information of each exterior image in the exterior image frames. Based on this comparison, the system may identify the relevant exterior images that match, are near, or are within a predetermined distance of the location of the interface element. In some embodiments, the predetermined distance may be less than 1 meter, 1 meter, 2 meters, 3 meters, 4 meters, or 5 meters.

After identifying the corresponding exterior images, the system may display them in the second portion of the interface. This may be achieved through updating the interface's content or rendering the selected images within the second portion of the interface using appropriate rendering techniques, such as 2D or 3D graphics libraries.

In some embodiments, the system may generate an additional interface element (e.g., buttons, icons, or sliders) within the second portion of the interface. This additional interface element may provide users with controls to switch between or navigate through the exterior image frames. The system may position the additional interface element within the second portion of the interface to make it easily accessible and visible to the user. The system may continuously monitor user interactions with the additional interface element added to the second interface portion, using event listeners or input handlers depending on the framework employed for the interface. Upon detecting the user's interaction with the additional interface element, the system may modify the second interface portion to switch between or provide control of the accessed exterior image frames. For example, this may be accomplished by updating the content of the second interface portion and adjusting the display of the exterior images according to user input.

In some embodiments, the system may modify the second interface portion to display the corresponding interior view of the building. This may be achieved by updating the content of the second interface portion and adding the relevant interior images based on the location information associated with the exterior view. These features may allow users to swiftly navigate between the exterior and interior views of a portion of the 3D model, offering a comprehensive understanding and visualization of the building's structure and/or environment.

In some embodiments, the system may identify a displayed portion of the 3D model that corresponds to one or more interior image frames. This process may involve using algorithms to match features present in the 3D model and the interior image frames. Based on the identification, the system may modify the first interface portion to display the interface element at the location corresponding to the identified portion of the 3D model. For example, the system may alter the first portion of the interface to display an interface element, which may appear at the location that corresponds to the identified part of the 3D model. In other words, the interface element may act as a marker or indication that there are corresponding interior images available for that part of the model. In response to the selection of the displayed interface element, the system may also modify a second interface portion to display the interior image frames that correspond to the identified portion of the 3D model. For example, when a user selects the interface element (engages with it, via a mouse click or a touch), the system modifies a second part of the interface to display the interior image frames that relate to the selected area in the 3D model. This process allows users to visually associate the real-life images with their 3D counterparts. Advantageously, this sequence of operations provides users with a better understanding of the spatial relations within the building, as the user can correspondingly view the real-life imagery and the 3D spatial model simultaneously.

Figure 5:
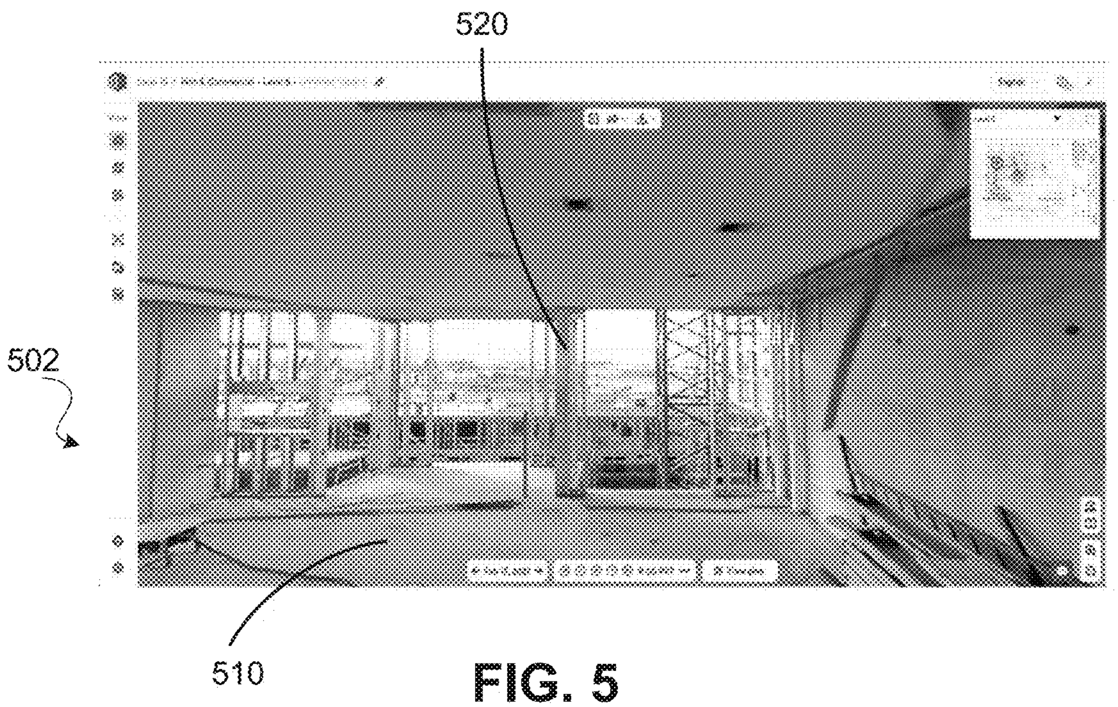
FIG. 5 illustrates an example interface, according to one embodiment.

FIG. 5 illustrates an interface 502 that displays an image of an interior 510 of a building. Within the interface 502, a portion 520 of an outside wall of the building under construction is shown from the interior 510 of the building. The portion 520 of the outside wall of the building may correspond to one or more exterior images of the building. The interface 502 may then be modified to include an interface element at a location within the image of the outside wall of the building. The interface element may be of any suitable form, for instance an icon or button. The interface element may indicate that one or more exterior views of the identified portion of the outside wall are available for viewing.

Figure 6:
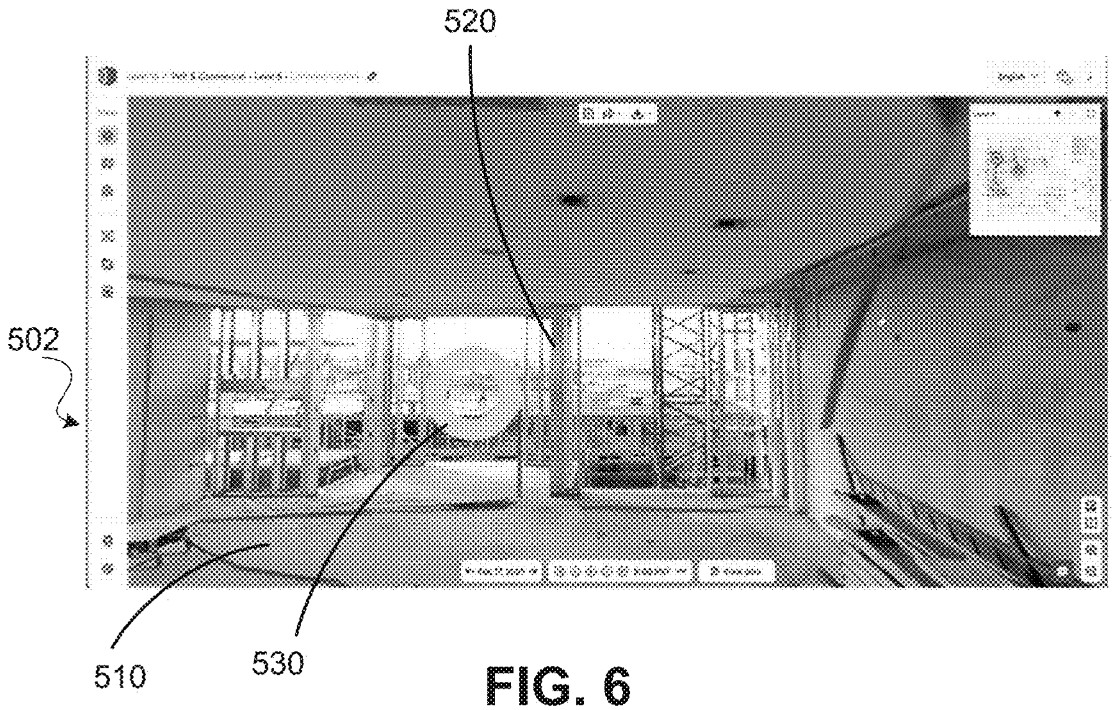
FIG. 6 shows a modified version of the interface of FIG. 5, according to one embodiment.

FIG. 6 shows the interface 502 of FIG. 5, where the interface 502 is modified to include an interface element 530 at a location of a portion of the outside wall. The interface element 530 is positioned adjacent to the portion 520 of the outside wall. In some embodiments, the location of the identified portion of the outside wall may be determined within a 3D model of the interior of the building or interior images of building, such that the location of the interface element within the displayed interface does not significantly change as a user "navigates" between different views, locations, or perspectives within the interior of the building.

Figure 7:
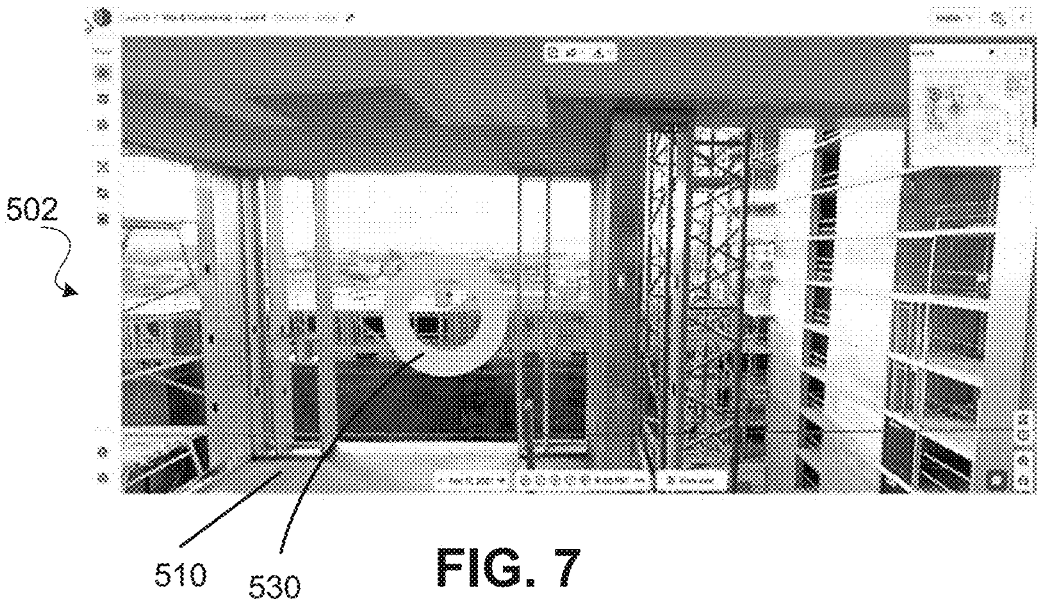
FIG. 7 shows a modified version of the interface of FIG. 5, according to one embodiment.

FIG. 7 shows the interface 502 of FIG. 6, where the interface 502 is modified to include the interface element 530 from a different perspective within the interior 510 of the building. In response to the selection of the interface element 530, the interface may be modified to include one or more exterior images of the building that correspond to the location of the identified portion of the outside wall of the building indicated by the interface element 530. The interface 502 may be modified to include the corresponding one or more exterior images of the building. For example, the interface may be modified such that the interior of the building is displayed within a first interface portion and the exterior of the building is displayed within a second interface portion.

Figure 8:
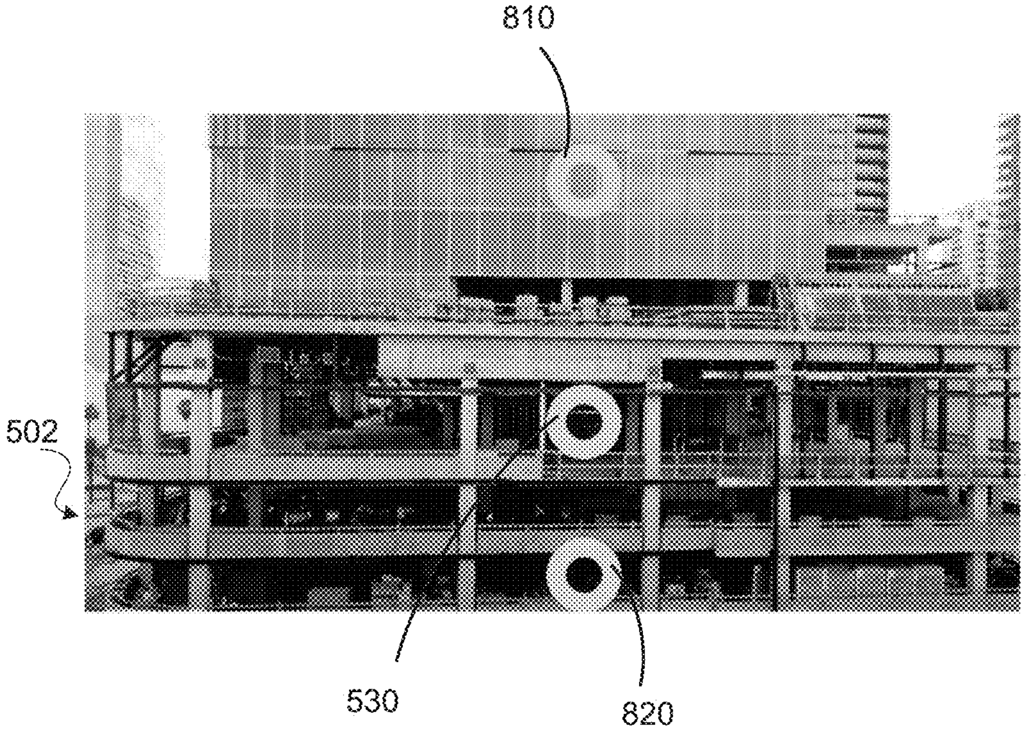
FIG. 8 illustrates an example interface, according to one embodiment.

FIG. 8 shows the interface 502 modified to display an image of an exterior of the building at the location corresponding to the interface element 530 displayed in the FIGS.

6 and 7. For example, the image shown in FIG. 8 may be captured by a UAV. The image shows an outside wall of the building that corresponds to the portion of the outside wall displayed in the two building interior interface examples of FIGS. 6 and 7. In the displayed image, additional interface elements 810 and 820 are displayed. Additional interface elements 810 and 820 are selectable (for e.g., clickable such as a user may click on the interface element). When selected, the interface 502 may be modified to include a representation of an interior view of the building at a location corresponding to the selected interface element. For instance, a selected interface element will modify the interface to show a representation of a floor of the building corresponding to the interface element, allowing a user to quickly navigate between internal views of different floors of the building based on a view of an outside of the building.

Although this example shows an interface that includes only an exterior view of the building, in practice a first portion of an interface (such as a left half of the interface) may show a view of an interior of a building and, in response to a selection of an interface element corresponding to an outside wall of the building and shown in the first portion of the interface, a second portion of the interface (such as a right half of the interface) may show a view of an exterior of the building corresponding to the outside wall of the building.

When a different interface element displayed within the second portion of the interface is selected (e.g., an interface element displayed on an exterior image of the building), the interior view of the building shown in the first portion of the interface may be modified to include a representation of a floor corresponding to the selected interface element. Likewise, when an interface element corresponding to a different outside wall of the building and displayed within the first interface portion is newly selected, the exterior portion of the building shown in the second portion of the interface may change to show images of the different outside wall corresponding to the newly selected interface element.

It should also be noted that a change in view of an interior of the building shown in the first interface portion may result in a change in view of an exterior of the building shown in the second interface portion. For instance, if a user modifies a perspective of the interior of the building to the left, the perspective of the exterior of the building may shift to the right, such that the portion of the outside wall of the building shown in each interface portion remains consistent. The amount of shifting of perspective in each interface portion may depend on a relative distance of an image capture device and the outside wall. For instance, if the distance between a first device and an outside wall that captures an interior image of the building is approximately half the distance between a second device and an outside wall that captures an exterior image of the building, the angle corresponding to the change in perspective of the exterior image displayed within the interface may be approximately half of the angle corresponding to the change in perspective of the interior image displayed within the interface.

VII. Hardware Components

Figure 9:
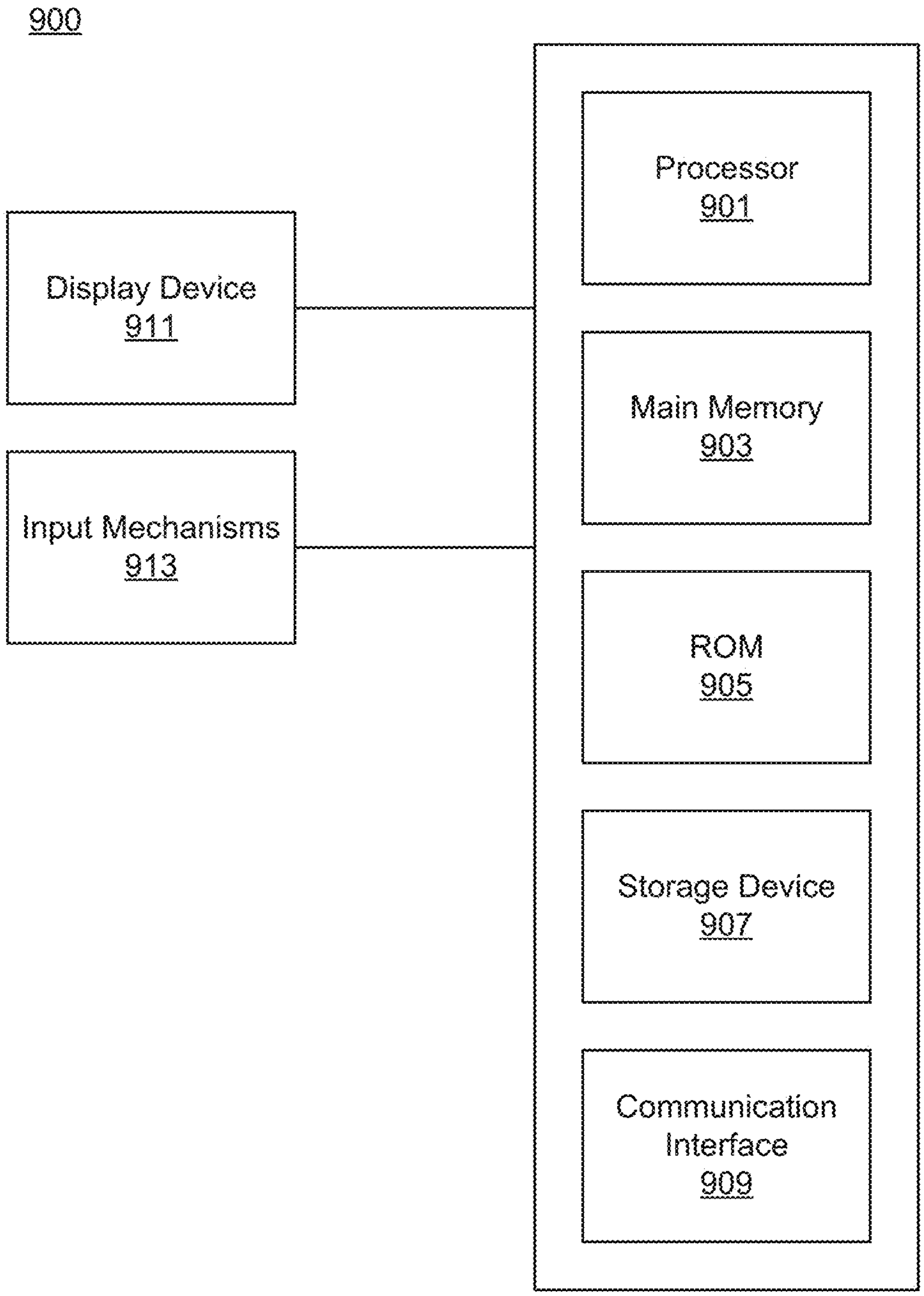
FIG. 9 is a diagram illustrating a computer system that implements the embodiments herein, according to one embodiment.

FIG. 9 is a block diagram illustrating a computer system 900 upon which embodiments described herein may be implemented. For example, in the context of FIG. 1, the video capture system 110, the LIDAR system 150, the spatial indexing system 130, or the client device 160 may be implemented using the computer system 900 as described in FIG. 9. The video capture system 110, the LIDAR system 150, the spatial indexing system 130, or the client device 160 may also be implemented using a combination of multiple computer systems 900 as described in FIG. 9. The computer system 900 may be, for example, a laptop computer, a desktop computer, a tablet computer, or a smartphone.

In one implementation, the system 900 includes processing resources 901, main memory 903, read only memory (ROM) 905, storage device 907, and a communication interface 909. The system 900 includes at least one processor 901 for processing information and a main memory 903, such as a random access memory (RAM) or other dynamic storage device, for storing information and instructions to be executed by the processor 901. Main memory 903 also may be used for storing temporary variables or other intermediate information during execution of instructions to be executed by processor 901. The system 900 may also include ROM 905 or other static storage device for storing static information and instructions for processor 901. The storage device 907, such as a magnetic disk or optical disk, is provided for storing information and instructions.

The communication interface 909 may enable system 900 to communicate with one or more networks (e.g., the network 120) through use of the network link (wireless or wireline). Using the network link, the system 900 may communicate with one or more computing devices, and one or more servers. The system 900 may also include a display device 911, such as a cathode ray tube (CRT), an LCD monitor, or a television set, for example, for displaying graphics and information to a user. An input mechanism 913, such as a keyboard that includes alphanumeric keys and other keys, may be coupled to the system 900 for communicating information and command selections to processor 901. Other non-limiting, illustrative examples of input mechanisms 913 include a mouse, a trackball, touch-sensitive screen, or cursor direction keys for communicating direction information and command selections to processor 901 and for controlling cursor movement on display device 911. Additional examples of input mechanisms 913 include a radio-frequency identification (RFID) reader, a barcode reader, a three-dimensional scanner, and a three-dimensional camera.

According to one embodiment, the techniques described herein are performed by the system 900 in response to processor 901 executing one or more sequences of one or more instructions contained in main memory 903. Such instructions may be read into main memory 903 from another machine-readable medium, such as storage device 907. Execution of the sequences of instructions contained in main memory 903 causes processor 901 to perform the process steps described herein. In alternative implementations, hard-wired circuitry may be used in place of or in combination with software instructions to implement examples described herein. Thus, the examples described are not limited to any specific combination of hardware circuitry and software.

VIII. Interior/Exterior Interface Generation

In some embodiments, the walkthrough interfaces described herein may be modified to display both interior and exterior representations of a building. For instance, the generation of a 3D model of an interior of a building based (at least in part) on image and depth information captured by a device as the device moves through the interior of the building is described above. For instance, the generation of a 3D model of an exterior of the building based on image and depth information captured by a UAV as the UAV moves around the outside of the building is described. Please note that image and/or depth information representative of the exterior of the building may be captured using other devices. For instance, for lower portions of the building, images may be captured by a user with a mobile device as the user walks around the exterior of the building, at or near ground level. Likewise, for higher portions of the building, images may be captured by the UAV as the UAV flies around an exterior of the building.

Corresponding interior and exterior portions of the building may be identified within the interior and exterior images of the building. In some embodiments, location information (such as GPS coordinates) may be used to identify interior and exterior images that correspond to the same portion of the building. For instance, an interior view of an outside wall of a building may be identified within an interior image using a set of GPS coordinates captured by the mobile device that captured the interior image. In one embodiment, a corresponding exterior image may be identified by querying GPS coordinates associated with the exterior images using the interior set of GPS coordinates to identify an exterior image closest to the interior set of GPS coordinates. In other embodiments, interior and exterior images are mapped to a common coordinate system (for instance, using GPS or other localization/alignment techniques). In yet other embodiments, both interior and exterior images are mapped to a floor plan for a building.

In some embodiments, in addition to generating an interior 3D model of a building, an exterior 3D model of the building may be generated using exterior images and depth information captured, for instance, by a UAV that travels around an exterior of the building (e.g., at one or more altitudes). In such embodiments, the interior 3D model and the exterior 3D model of the building may be aligned, enabling locations within the interior 3D model and locations within the exterior 3D model that correspond to a same portion of a building's outside wall to be identified.

By identifying portions of a building's interior that correspond to portions of the building's exterior within images, 3D models, floor plans, or common coordinate systems of the interior and exterior, an interface may be generated that enables a user to switch between or to simultaneously see interior and exterior views of a building.

Within the interface, which shows an image of an outside wall of a building under construction from an interior of a building, a portion of an outside wall of the building that corresponds to one or more exterior images of the building may be identified. The interface may then be modified by including an interface element at a location within the image of the outside wall of the building. The interface element may be of any suitable form such as an icon or button that indicates that one or more exterior views of the identified portion of the outside wall are available for viewing. The interface may be modified to include the interface element at a location of the identified portion of the outside wall In some embodiments, the location of the identified portion of the outside wall may be determined within a 3D model of the interior of the building or interior images of building, such that the location of the interface element within the displayed interface does not significantly change as a user "navigates" between different views, locations, or perspectives within the interior of the building. The interface may be modified to include the interface element from a different perspective within the interior of the building.

In response to the selection of the interface element, the interface may be modified to include one or more exterior images of the building that correspond to the location of the identified portion of the outside wall of the building indicated by the interface element. The entire interface may be modified to include the corresponding one or more exterior images of the building. The interface may be modified such that the interior of the building is displayed within a first interface portion and the exterior of the building is displayed within a second interface portion.

The interface may be modified to display an image of an exterior of the building at the location corresponding to the interface element. The image may display an outside wall of the building that corresponds to the interface element location. In the displayed image, additional interface elements may be displayed that, when selected, modify the interface to include a representation of the interior of the building at a location corresponding to the selected interface element. For instance, a selected interface element will modify the interface to show a representation of a floor of the building corresponding to the interface element, allowing a user to quickly navigate between interior views of different floors of the building based on a view of the outside of the building.

Although an interface may include only an exterior view of the building, in practice a first portion of an interface (such as a left half of the interface) may show a view of an interior of the building and, in response to a selection of an interface element corresponding to an outside wall of the building and shown in the first portion of the interface, a second portion of the interface (such as a right half of the interface) may show a view of an exterior of the building corresponding to the outside wall of the building.

When a different interface element displayed within the second portion of the interface is selected (e.g., an interface element displayed on an exterior image of the building), the interior view of the building shown in the first portion of the interface may be modified to include a representation of a floor corresponding to the selected interface element. Likewise, when an interface element corresponding to a different outside wall of the building and displayed within the first interface portion is newly selected, the exterior portion of the building shown in the second portion of the interface may change to show images of the different outside wall corresponding to the newly selected interface element.

It should also be noted that a change in view of an interior of the building shown in the first interface portion may result in a change in view of an exterior of the building shown in the second interface portion. For instance, if a user modifies a perspective of the interior of the building to the left, the perspective of the exterior of the building may shift to the right, such that the portion of the outside wall of the building shown in each interface portion remains consistent. The amount of shifting of perspective in each interface portion may depend on a relative distance of an image capture device and the outside wall. For instance, if the distance between a first device and an outside wall that captures an interior image of the building is approximately half the distance between a second device and an outside wall that captures an exterior image of the building, the angle corresponding to the change in perspective of the exterior image displayed within the interface may be approximately half of the angle corresponding to the change in perspective of the interior image displayed within the interface.

IX. Additional Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:
- accessing interior image frames captured by a mobile device as the mobile device is moved through an interior of a building;
- accessing exterior image frames captured by an unmanned aerial vehicle ("UAV") as the UAV navigates around an exterior of the building;
- generating a 3D model representative of the building based on the accessed interior image frames and the accessed exterior image frames;
- generating an interface displaying an interior portion of the 3D model corresponding to an interior of the building in a first interface portion;
- identifying an exterior portion of the 3D model that corresponds to an exterior of the building and that corresponds to a location associated with the interior portion of the 3D model, the identified exterior portion of the 3D model associated with one or more of the accessed exterior image frames, wherein the exterior portion is identified by 1) extracting features from the exterior image frames, 2) aligning the exterior image frames with the 3D model using corresponding features of the exterior image frames and features of the 3D model, and 3) selecting the exterior portion of the 3D model based on the alignment;
- modifying the displayed interior portion of the 3D model to display an interface element at a location within the 3D model corresponding to the interior portion of the 3D model; and
- in response to a selection of the displayed interface element, modifying a second interface portion to display the one or more accessed exterior image frames simultaneously with the display of the interior portion of the 3D model within the first interface portion.

2. The method of claim 1, wherein generating the 3D model representative of the building based on the image frames comprises:
- integrating depth information with the interior image frames such that both the interior image frames and the depth information provide a more comprehensive representation of the interior of the building;
- generating an interior 3D model based on the interior image frames and the depth information; and
- mapping the interior 3D model to a coordinate system or a floor plan for the building.

3. The method of claim 2, wherein generating the 3D model representative of the building based on the image frames comprises:
- aligning the 3D model with the image frames for consistency and accuracy in spatial representation.

4. The method of claim 1, wherein generating the interface displaying the 3D model in the first interface portion comprises:
- defining a structure of the interface, wherein the interface comprises two portions such that one portion is configured to display the 3D model and another portion is configured to display the image frames;
- integrating the 3D model and the image frames into the interface structure; and
- deploying the interface to a user device for visualization and interaction by the user.

5. The method of claim 1, wherein modifying the displayed interior portion of the 3D model to display the interface element at the location within the 3D model corresponding to the identified portion of the 3D model comprises:
- generating the interface element, wherein the interface element indicates one or more exterior views of the identified portion of the 3D model are available for viewing; and
- placing the interface element at the location within the 3D model corresponding to the identified portion of the 3D model.

6. The method of claim 1, wherein modifying the second interface portion to display the one or more accessed exterior image frames comprises:
- listening for user interactions with the interface element and detecting when a user has selected the interface element;
- upon detecting user interaction with the interface element, retrieving location information that corresponds to the portion of the building represented by the interface element;
- using the location information, identifying the exterior images corresponding to the selected interface element; and
- displaying the identified exterior images in the second interface portion.

7. The method of claim 6, wherein identifying the exterior images corresponding to the selected interface element comprises:
- retrieving the location information corresponding to the portion of the building represented by the interface element, wherein the location information comprises GPS coordinates, a coordinate system, or building floor plan coordinates;
- comparing the interface element's location with the location information of each exterior image in the exterior image frames; and
- based on the comparison of location information, identifying the exterior images corresponding to the selected interface element.

8. The method of claim 1, wherein modifying the second interface portion to display the one or more accessed exterior image frames comprises:
- providing an additional interface element within the second interface portion, wherein selection of the additional interface element causes the second interface portion to switch between or provide control of the one or more accessed exterior image frames.

9. The method of claim 1, wherein modifying the second interface portion to display the one or more accessed exterior image frames comprises:
- providing an additional interface element within the second interface portion, wherein selection of the additional interface element causes the second interface portion to display a corresponding interior view of the building.

10. The method of claim 1, further comprising:
- identifying the displayed portion of the 3D model that corresponds to one or more of the accessed interior image frames;

modifying the first interface portion to display the interface element at the location corresponding to the identified portion of the 3D model; and in response to the selection of the displayed interface element, modifying a second interface portion to display the one or more accessed interior image frames that correspond to the identified portion of the 3D model.

11. A system comprising:

a hardware processor; and a non-transitory computer-readable storage medium storing executable instructions that, when executed by the hardware processor, cause the hardware processor to perform steps comprising:

accessing interior image frames captured by a mobile device as the mobile device is moved through an interior of a building;

accessing exterior image frames captured by an unmanned aerial vehicle ("UAV") as the UAV navigates around an exterior of the building;

generating a 3D model representative of the building based on the accessed interior image frames and the accessed exterior image frames;

generating an interface displaying an interior portion of the 3D model corresponding to an interior of the building in a first interface portion;

identifying an exterior portion of the 3D model that corresponds to an exterior of the building and that corresponds to a location associated with the interior portion of the 3D model, the identified exterior portion of the 3D model associated with one or more of the accessed exterior image frames, wherein the exterior portion is identified by 1) extracting features from the exterior image frames, 2) aligning the exterior image frames with the 3D model using corresponding features of the exterior image frames and features of the 3D model, and 3) selecting the exterior portion of the 3D model based on the alignment;

modifying the displayed interior portion of the 3D model to display an interface element at a location within the 3D model corresponding to the interior portion of the 3D model; and in response to a selection of the displayed interface element, modifying a second interface portion to display the one or more accessed exterior image frames simultaneously with the display of the interior portion of the 3D model within the first interface portion.

12. The system of claim 11, wherein generating the 3D model representative of the building based on the image frames comprises:

integrating depth information with the interior image frames such that both the interior image frames and the depth information provide a more comprehensive representation of the interior of the building;

generating an interior 3D model based on the interior image frames and the depth information; and mapping the interior 3D model to a coordinate system or a floor plan for the building.

13. The system of claim 12, wherein generating the 3D model representative of the building based on the image frames comprises:

aligning the 3D model with the image frames for consistency and accuracy in spatial representation.

14. The system of claim 11, wherein generating the interface displaying the 3D model in the first interface portion comprises:

defining a structure of the interface, wherein the interface comprises two portions such that one portion is configured to display the 3D model and another portion is configured to display the image frames;

integrating the 3D model and the image frames into the interface structure; and deploying the interface to a user device for visualization and interaction by the user.

15. The system of claim 11, wherein modifying the displayed interior portion of the 3D model to display the interface element at the location within the 3D model corresponding to the identified portion of the 3D model comprises:

generating the interface element, wherein the interface element indicates one or more exterior views of the identified portion of the 3D model are available for viewing; and placing the interface element at the location within the 3D model corresponding to the identified portion of the 3D model.

16. The system of claim 11, wherein modifying the second interface portion to display the one or more accessed exterior image frames comprises:

listening for user interactions with the interface element and detecting when a user has selected the interface element;

upon detecting user interaction with the interface element, retrieving location information that corresponds to the portion of the building represented by the interface element;

using the location information, identifying the exterior images corresponding to the selected interface element; and displaying the identified exterior images in the second interface portion.

17. The system of claim 16, wherein identifying the exterior images corresponding to the selected interface element comprises:

retrieving the location information corresponding to the portion of the building represented by the interface element, wherein the location information comprises GPS coordinates, a coordinate system, or building floor plan coordinates;

comparing the interface element's location with the location information of each exterior image in the exterior image frames; and based on the comparison of location information, identifying the exterior images corresponding to the selected interface element.

18. A non-transitory computer-readable storage medium storing executable instructions that, when executed by a hardware processor, cause the hardware processor to perform steps comprising:

accessing interior image frames captured by a mobile device as the mobile device is moved through an interior of a building;

accessing exterior image frames captured by an unmanned aerial vehicle ("UAV") as the UAV navigates around an exterior of the building;

generating a 3D model representative of the building based on the accessed interior image frames and the accessed exterior image frames;

generating an interface displaying an interior portion of the 3D model corresponding to an interior of the building in a first interface portion;

identifying an exterior portion of the 3D model that corresponds to an exterior of the building and that corresponds to a location associated with the interior portion of the 3D model, the identified exterior portion of the 3D model associated with one or more of the accessed exterior image frames, wherein the exterior portion is identified by 1) extracting features from the exterior image frames, 2) aligning the exterior image frames with the 3D model using corresponding features of the exterior image frames and features of the 3D model, and 3) selecting the exterior portion of the 3D model based on the alignment;

modifying the displayed interior portion of the 3D model to display an interface element at a location within the 3D model corresponding to the interior portion of the 3D model; and in response to a selection of the displayed interface element, modifying a second interface portion to display the one or more accessed exterior image frames simultaneously with the display of the interior portion of the 3D model within the first interface portion.

* * * * *